(12) United States Patent
Singh

(10) Patent No.: US 12,536,222 B2
(45) Date of Patent: Jan. 27, 2026

(54) SYSTEMS AND METHODS FOR NAVIGATING AN EXTENDED REALITY HISTORY

(71) Applicant: Adeia Guides Inc., San Jose, CA (US)

(72) Inventor: Mona Singh, Cary, NC (US)

(73) Assignee: Adeia Guides Inc., San Jose, CA (US)

(*) Notice: Subject to any disclaimer, the term of this patent is extended or adjusted under 35 U.S.C. 154(b) by 0 days.

(21) Appl. No.: 17/976,985

(22) Filed: Oct. 31, 2022

(65) Prior Publication Data

US 2024/0143650 A1    May 2, 2024

(51) Int. Cl.
*G06F 16/30* (2019.01)
*G06F 16/535* (2019.01)
*G06F 16/538* (2019.01)
*G06F 16/55* (2019.01)

(52) U.S. Cl.
CPC .......... *G06F 16/538* (2019.01); *G06F 16/535* (2019.01); *G06F 16/55* (2019.01)

(58) Field of Classification Search
CPC ....... G06T 19/006; G06T 11/00; G06V 20/20; G06V 20/30; G06F 3/011; G06F 16/538; G06F 16/55; G06F 16/5854; G06F 18/22; G06F 3/0482; A63F 13/655; H04L 67/535; H04N 21/8549; H04N 345/633
See application file for complete search history.

(56) References Cited

U.S. PATENT DOCUMENTS

| | | | |
|---|---|---|---|
| 10,678,398 B2* | 6/2020 | Anderson | G06F 16/54 |
| 2015/0063665 A1* | 3/2015 | Sasakido | G06V 40/174 |
| | | | 382/128 |
| 2015/0120616 A1* | 4/2015 | Sullivan | G06F 3/0481 |
| | | | 706/11 |
| 2015/0206343 A1* | 7/2015 | Mattila | G06T 17/05 |
| | | | 345/420 |
| 2015/0227796 A1* | 8/2015 | Holzschneider | G06T 11/60 |
| | | | 382/103 |
| 2015/0262428 A1* | 9/2015 | Tatzgern | G06F 3/017 |
| | | | 345/633 |

(Continued)

OTHER PUBLICATIONS

Ponto et al. "Effective Replays and Summarization of Virtual Experiences," Apr. 2012, IEEE Transactions on Visualization and Computer Graphics, vol. 18, No. 4 (Year: 2012).*

(Continued)

*Primary Examiner* — Polina G Peach
(74) *Attorney, Agent, or Firm* — HALEY GUILIANO LLP

(57) ABSTRACT

A plurality of snapshots from XR sessions are retrieved. A plurality of entities within the plurality of snapshots are identified. Based on the identified plurality of entities, a plurality of salient snapshots is identified. The plurality of snapshots is partitioned into contiguous clusters, with each cluster containing a salient snapshot. The salient snapshots are generated for presentation to the user and, in response to selection of a salient snapshot, a subset of the plurality of entities from within a cluster containing the selected salient snapshot is generated for presentation to the user. In response to selection of a presented entity of the presented subset of the plurality of entities, snapshots including the selected entity are generated for presentation. In response to selection of a snapshot, an XR scene corresponding to the selected snapshot is generated for presentation.

20 Claims, 10 Drawing Sheets

(56) References Cited

U.S. PATENT DOCUMENTS

| | | | | |
|---|---|---|---|---|
| 2016/0027044 | A1* | 1/2016 | Sharifi | G06Q 30/0251 |
| | | | | 705/14.49 |
| 2016/0217623 | A1* | 7/2016 | Singh | G09G 5/00 |
| 2016/0259854 | A1* | 9/2016 | Liu | G06F 16/739 |
| 2017/0053451 | A1* | 2/2017 | Mott | G01C 21/16 |
| 2017/0098317 | A1* | 4/2017 | Qi | G06F 18/22 |
| 2017/0178058 | A1* | 6/2017 | Bhat | G06T 7/0002 |
| 2017/0328730 | A1* | 11/2017 | Amacker | G06Q 30/0201 |
| 2019/0052939 | A1* | 2/2019 | Wang | H04N 21/4826 |
| 2019/0355153 | A1* | 11/2019 | Singh | H04N 21/816 |
| 2020/0045222 | A1* | 2/2020 | Franzius | H04N 23/698 |
| 2021/0060434 | A1* | 3/2021 | Challinor | A63F 13/213 |
| 2021/0090233 | A1* | 3/2021 | Liu | G06T 7/0002 |
| 2021/0124774 | A1* | 4/2021 | Bedi | G06F 16/538 |
| 2021/0373720 | A1* | 12/2021 | Anderson | G06F 9/45558 |
| 2022/0028124 | A1 | 1/2022 | Singh | |
| 2022/0043879 | A1* | 2/2022 | Trigalo | G06F 40/166 |
| 2022/0167108 | A1* | 5/2022 | Laaksonen | H04S 7/304 |
| 2022/0222297 | A1* | 7/2022 | Chow | G06F 16/9537 |

OTHER PUBLICATIONS

Bell, "A new Google tool actually lets you search videos for specific objects, " (https://mashable.com/article/google-video-intelligence-api) (2017) (7 Pages).

* cited by examiner

SYSTEMS AND METHODS FOR NAVIGATING AN EXTENDED REALITY HISTORY

BACKGROUND

This disclosure is directed to session histories for extended reality sessions. In particular, techniques are disclosed for improving navigation through extended reality session histories.

SUMMARY

Being able to explore the history of an interaction to find something relevant again is a crucial element of user experience for any interactive technology. For example, a user may wish to relive a specific part of an experience (e.g., not just meeting a friend for drinks but the moment where someone walked by or a drink spilled) or review their own actions to remind themselves of what they did. Users may wish to find some person, avatar, or inanimate object (e.g., lost keys) that they had interacted with before or that they had not interacted with much before (e.g., shoes placed below a dress rack that the user did not look closely at earlier because she was focused on the dresses at that time). Users may also want to go back to an experience where they heard a loud sound. Users may want to share selected parts of the history with others, reconfirm what they may have seen or heard during the session or quickly go back to a place where they want to perform an action (e.g., buy a product that they saw).

In current VR tools, there is no effective way to present the user's history to the user. For example, the Oculus VR headset presents the user with textual links. In other words, the history is presented in much the same way as a current-generation web browser. This approach is not ideal even for web browsers and is simply unusable for VR since users don't have textual artifacts such as web pages on which to anchor their thinking or memories. This approach shows headers of the parts of the virtual world that the user visited but does not provide the user with any information about what happened there (e.g., an experience or interaction that the user may remember).

This disclosure brings forth the salient parts of a VR session to help the user identify a series of snapshots during the session. The process is iterative and interactive with the user. An initial estimate of the salience of different parts of the VR session is made based on the user's engagement. However, a user may be interested in identifying a part of the history where the user had low engagement. Hints are taken from the user and the salient parts of the history are iteratively recomputed. In this way, the salient parts of the history that match the user's needs are identified.

Described herein are systems and methods that determine the salient snapshots from a user's history as a way to help the user locate what it is they seek in the history. This provides an interactive and iterative approach in which the user views the salient snapshots identified by the invention and then adds some information about which entities are more relevant and which entities are less relevant. Salient snapshots are recomputed based on the user's information. Thus, the techniques disclosed herein help the user zero in on the part of the VR/AR history that is most relevant.

Previous approaches to presenting the VR history to a user are not iterative and do not take interactive user feedback. They do not provide information about what occurred during different parts of a session and instead provide information on what or where the user visited. Current methods focus on searching for an object. But in many cases, the user may not remember an object or be able to identify an object. In some cases, the user may be trying to find something that happened even if it wasn't important to the user at that time. For example, the user may have seen someone walk by while she was browsing through a store. There is no good traditional way to search the history in that case. With the approached described herein, the user wouldn't search the history for a specific query but instead navigate the history to find what they are interested in. For example, systems and methods described herein would show the user a few salient snapshots. One such snapshot may include a detail that was unimportant at the time, but that the user may remember, such as a blue dress. The user may then recall and say "Yes, it had something to do with the blue dress" or "No, it was before I saw the blue dress."

As used herein, an entity refers to any person or object. As used herein, a snapshot refers to the totality of what the user perceives at any time during a VR session. A snapshot is thus a combination of information about the place the user is visiting (including the scene and the objects in it), the user's perspective on that place, who else is visiting that place at that time, the user's emotions, and the user's communications (both incoming and outgoing, in text, speech, or another modality). Therefore, a snapshot may include metadata about the place the user is visiting (including the scene and the objects in it), metadata about the coordinates and orientation of the user in the virtual or real world at the time (for example, in a virtual mall, a first snapshot of the user could show the user as being present at the entry point of a particular store and looking into the store, and a second snapshot could be of the user at some position inside the store and looking at the back wall 10 feet above the floor), metadata about the user's emotions, or metadata about communications to or from the user or between other entities.

The systems and methods described herein do not require snapshots of a specific duration. That is, the duration of a snapshot can be anything and take into account practical constraints such as storage and computing. For example, it could be as fast as the frame rate of the videos being shown to the user but would often be much coarser, e.g., at the granularity of one second or one minute. Coarser snapshots would miss some details but would be easier for storage and computing, and potentially less burdensome for the user, though they would also be less complete in terms of covering the history.

As used herein, "history" refers to a series of snapshots observed by the user during a session. Some snapshots may be less relevant than others. As used herein, a salient snapshot is one that is more relevant to the user. This disclosure provides insights on how a snapshot may be determined to be salient. As used herein, a "cluster" refers to a contiguous series of one or more snapshots, exactly one of which is a salient snapshot.

A snapshot may represent a location in the real world. Accordingly, geospatial coordinates may be associated with the snapshot. A snapshot may also represent a location in a virtual world. For replaying the history, any location representation of a virtual location may be adequate. However, if the user wishes to revisit a location to obtain a new experience there or to share the location with a friend so the friend can obtain an experience, the representation must be such that it is coherent. For this purpose, the metadata about location could be captured as a combination of two representations. The location could have a component that is analogous to geospatial coordinates (latitude, longitude, and altitude, or lot number, or street address), and may, for example, point to a virtual mall that is similar to a real mall. The coordinates may even be used to pick out a particular store, such as a seventh store to the left as you enter. The location could also have a component that is "symbolic" such as the name of a store. When the user goes to a location a second time, the company doing business in that space may have changed. To ensure that the user experience on returning to the location is coherent, the tool can verify if the geospatial and symbolic metadata are aligned. That is, it is the same company operating in the same space. Otherwise, a warning or other notification can be issued to the user to inform them that what they will see may be different from their expected experience.

A user's history may be received as a series of time-ordered snapshots. Entities that occur anywhere in the received history are identified and salient snapshots are then determined based on the entities they comprise. For example, each snapshot may be weighted proportionally to the novelty of the entities present in the snapshot or with respect to the attributes (e.g., shape, size, or color) of the entities present in the snapshot. Snapshots may also be weighted proportionally to the user's engagement with (observation of, conversation with, motion toward or away, action on) the entities present in the snapshot, or proportionally to the user's emotion (arousal, activation, valence) when the user first experienced what is captured in that snapshot. Another example may include weighting each snapshot inversely proportionally to its similarity to temporally adjacent snapshots (objects and people present, or activities ongoing). Snapshots with the highest weights may then be selected, up to some preset number of snapshots.

The snapshots can be grouped into contiguous clusters that together cover the whole history, where each cluster contains at least one salient snapshot and may contain zero or more non-salient snapshots. The history is then presented to the user as a series of salient snapshots in temporal order. The user may, in some cases, be presented with a scale to represent their emotional state at each snapshot. The emotional state may be recorded through biometric data captured during the time associated with the snapshot, or manually entered by the user at the time or any time thereafter. The user may also be presented with other characteristics of each snapshot, such as associated sounds, movements, or the number of people in the vicinity of the user within the virtual world at the time. A snapshot may contain only sounds or people or inanimate objects.

Upon the user interacting with a salient snapshot, relevant entities in the associated cluster of snapshots are displayed. The entities may be ranked based on how often or how strongly the user interacted with them in the past and sorted in decreasing order. In some cases, the entities may be clustered based on similarities in at least one characteristic. If an entity appears in more than one snapshot, that entity may be given a higher rank. The user may select an entity to promote to a higher rank. Upon the user selecting and promoting an entity, identification of salient snapshots is repeated, with increased weight given to the promoted entity. If the user selects to remove and/or demote an entity, identification of salient snapshots is repeated with reduced weight given to the demoted or removed entity.

In some cases, the user may narrow in on a temporal window of the history. For example, the user may indicate, through one or more inputs, that they are interested in the portion of the history that is after a first snapshot and/or before a second snapshot. Identification of salient snapshots is then repeated for the indicated subset of the history.

In response to selection of a salient snapshot, the user may be taken to the associated location in the virtual world. This may be accomplished based on location information associated with the snapshot. It may appear to the user as though they were teleported to that location.

In one embodiment, the user may be presented with a set of options related to the actions that he can take when he has identified the desired snapshot. The actions include but are not limited to (1) going to the virtual world in the same location, (2) replaying the part of the history, (3) sending the relevant part of the history to someone, and/or (4) getting the geographic coordinates for a physical location. A user interface to select from these options may be presented to the user in the form of gestures, text links, spoken commands, etc. In one embodiment, the user is able to identify a snapshot as "Begin clip" and a subsequent snapshot as "End clip." The user may then be prompted to send the snippet of the history beginning from "Begin clip" and ending at "End clip" to a specified contact.

In some implementations, an extended reality (XR) history datastore (e.g., a database) stores the history of a user's VR episode. The history includes a series of snapshots, including the metadata, and includes what was displayed to the user, what interactions the user carried out, and biometric data on the user (indicating the emotional state the user was in at that time). This XR history datastore may be located in the cloud. Alternatively or additionally, the XR history datastore may be local to the VR device or located at a device on the same local network as the VR device. A local XR history datastore may store only a portion of the user's total history, such as the last five VR sessions or the last month of activity. The XR history datastore combines the received XR content with the received user biometrics and behavior data to identify and store snapshots. The snapshots therefore include these as metadata. In one embodiment, the XR history datastore may be on an associated user device, such as a mobile phone.

Information needed to be captured for this system and method includes the changing scene being projected to the user, and user-specific information. The changing scene may be nothing more than a video, to which normal video compression techniques may be applied. In some cases, the changing scene may be dynamically generated by a server or application. The content may therefore need to be captured and encoded in a video format. When the setting is a virtual world, metadata on the entities in the scene is available already and can be extracted and stored. For example, the visible objects can refer to corresponding object IDs in the virtual world model that is being experienced by the user. When the setting is the real world, metadata on the entities would need to be extracted through the processing of sensor data, e.g., by carrying out object recognition for objects or face recognition for humans. The user-specific information includes user sensor data (e.g., gaze, heart rate, speech, gestures, or other data that can be gathered by biometric and environmental sensors).

The VR display is what presents information to the user, including visual, audio, and haptic information. This component is located on the user's device, which may be a head-mounted device. Sensors on or focused on the user could include a controller (such as a joystick or a selector button), an eye gaze tracker, or another device for measuring the user's biometrics (such as heart rate). In general, system user would have many sensors observing the user. These may also be located on the user's device.

An extended reality server may carry out the bulk of the processing. This server is typically located in the cloud and sends VR content to the VR display along with a copy to the extended reality history datastore. It receives the information on the user's biometrics and behavior and forwards it to the extended reality history datastore for storage. The extended reality server receives a history from the extended reality history datastore and presents the history to the user in the interactive way described below.

The extended reality server, upon receiving a history, extracts the metadata from it. The metadata includes the entities in each snapshot and their interactions, the user's state at the time of viewing that snapshot, and the user's interactions. From among the snapshots, it identifies the salient snapshots based on their ranking in terms of three sets of factors: the world, the user, and user's engagement. Each snapshot of the history may be evaluated individually, or an intermediate representation may be formed that identifies snapshots where there was high user engagement or high user emotion and focusing on those snapshots to conduct a deeper analysis of the world content of those snapshots.

The extended reality server forms indexes to enable searching by that metadata. Specifically, for each identified entity, it creates a list of snapshots in which it occurs (audibly or visually) along with the list of entities occurring in each snapshot. When a snapshot is presented to the user, the extended reality server extracts the associated entities from the list and sends them out for display. When the user selects one or more entities from a snapshot and marks them for promotion (the default), the extended reality server searches the index to find the snapshots in which those entities occur. It then recomputes the weights of those snapshots by assigning higher weights to the entities the user selected for promotion.

When the user selects one or more entities from a snapshot and marks them for demotion, the extended reality server disregards those entities when it searches the index (i.e., it focuses on the promoted entities). However, the demoted entities may still occur in some of the snapshots. The extended reality server recomputes the weights of the selected snapshots by assigning lower weights to the entities the user selected for demotion.

In one example, a user goes to a virtual mall to shop for clothes. As she walks into a clothing store, she notices two signs by the front entrance. For the purposes of this disclosure, these signs are considered to be entities. The user may have a first level of engagement with the entities in the snapshot. For example, the user may be more interested in a sign advertising a 20% off sale, as she plans to buy only one item, than in a sign advertising a buy 3, get one free deal. For example, the user may have spent additional time to check if there was a minimum spend amount required for the 20% discount. This VR content is sent to the extended reality history datastore, along with the user's biometrics and behavior (e.g., her gaze and emotional state). The extended reality history datastore constructs the corresponding snapshot by combining the VR content with metadata pertaining to the entities in it as well as the user's state and behavior.

The user walks into the clothing store and looks at some items of clothing. The extended reality history datastore saves a snapshot. The user then moves on and notices another item that she likes on a mannequin. She stops and considers the item for a time and then moves on. Again, the extended reality history datastore saves a snapshot. In this snapshot, the user's engagement is higher than in the first snapshot.

The user then notices a "final sale" sign in another part of the store. She does not usually look at these items, and so she moves on without stopping. Another snapshot is saved to the extended reality history datastore and is associated with a slightly negative emotion. The "final sale" sign is added to the list of entities. After the clothing store, the user goes to a grocery store. The extended reality history datastore saves a series of snapshots as the user navigates through the grocery store.

The next day, the user may still be concerned that she does not have the right clothing for the party. She thinks again about the item she saw on the mannequin at the clothing store, but she does not remember which part of the store it was in. The user requests to navigate the history of her trip to the virtual mall. The extended reality server obtains the relevant history from the extended reality history datastore. The extended reality server identifies the salient snapshots. In this example, we set the "budget" of the number of salient snapshots to be shown as two. The budget should be chosen to match the screen area available and how small to make the snapshots so that they are visible and clear to the user while leaving room for additional information. The default budget may be two snapshots, but the user may configure the budget according to their needs. The extended reality server forms the corresponding clusters of snapshots. The user then sees two salient snapshots in the navigation history bar for that session.

The user selects a first salient snapshot. This selection may be accomplished in a variety of ways, including eye gaze settling on the first snapshot, gesture, voice command, or use of an input device. In response to selection of the first snapshot, the user is presented with the relevant entities in the corresponding cluster, shown in the order of their estimated importance to the user. The importance may be based on the same indicators of novelty, engagement, and emotion mentioned above, since those indicators are used to determine which snapshots are salient. The user may then select the desired entity, e.g., the clothing item seen on the mannequin. Salience of each snapshot is then recalculated based on the input. Snapshots from the grocery store portion of the history become too unimportant and no longer appear in the history. Instead, a different set of salient snapshots, all from the clothing store, are presented to the user. The user can then select a snapshot and go back to the associated location in the virtual mall.

The user may interact with another person while at the virtual mall. For example, the user may have a brief conversation with another person at the clothing store. At the time of the interaction, the user may not have paid attention to the items that the other person had but may later wish to go back and see what items they had to get some inspiration of what to wear. When the list of salient snapshots is presented, the user may select one for the clothing store, then select the other person from the list of entities present in that cluster of snapshots. The user can then go back and look at the items that the other person had.

In an augmented reality (AR) implementation, sensors in the AR display device are focused on the real world, such as cameras. A user may attend an event while wearing an AR head-mounted display and, on the way home, discover that they have lost their keys. The user can use the snapshots to determine when he last had his keys. For example, the user may remember that he had his keys with him when he met another person with whom he had a long conversation. The other person becomes a highly ranked entity for the cluster of snapshots representing the event. An item that the other person had with them may also be given a high rank. The user may then go on to play a game of catch with a friend at the event. The ball they were throwing, being in the user's field of view and/or the focus of the user's gaze for a long time, may also be given a high rank.

The user may choose the snapshot for his conversation with the other person as being the closest in time to the last time he remembers having his keys. The list of entities associated with the cluster of snapshots related to the conversation includes the keys. The user may choose that entity as an entity to search for. A new set of snapshots may then be presented to the user, from both before and after the conversation with the other person. The user may choose the temporally last snapshot in order to see the last known location of his keys. The user can then return to that location to look for the keys.

Systems and methods are described herein for facilitating navigation of an XR history. A plurality of snapshots of one or more XR sessions are retrieved. These snapshots may be two- or three-dimensional images or representations of physical or virtual locations captured during the one or more XR sessions. A plurality of entities within the plurality of snapshots are then identified. Every object, surface, person/avatar may be individually identified as an entity. Based on the identified plurality of entities, a plurality of salient snapshots is then identified. The salience of a given snapshot may be determined in different ways, as discussed below. The plurality of snapshots is partitioned into contiguous clusters, with each cluster containing a salient snapshot. The salient snapshots are generated for presentation to the user and, in response to selection of a salient snapshot, a subset of the plurality of entities from within a cluster containing the selected salient snapshot is generated for presentation to the user. In response to selection of a presented entity of the presented subset of the plurality of entities, at least one snapshot including the selected entity is generated for presentation and, in response to selection of a snapshot, an XR scene corresponding to the selected snapshot is generated for presentation.

To identify a salient snapshot, each snapshot may be weighted based on the number of unique entities it contains. For example, a set of entities may be present in a number of snapshots while a single entity may be present in only one of those snapshots. The set of entities are thus not unique to any snapshot while the single entity is unique to one snapshot, so it may therefore be assigned a higher weight. Higher weights may also be assigned based on the number of unique entity attributes (e.g., shape, size, color) in each snapshot. For example, one snapshot may include a red car while all other snapshots include only black cars. Levels of user engagements with entities in a snapshot during an XR session can also be used to weight each snapshot. For example, if the user interacted more extensively (e.g., longer time, more significant interaction, etc.) with an entity contained in a snapshot, that snapshot may be given a higher weight. In some embodiments, one or more biometric parameters of the user may be monitored during the XR session. An instantaneous value of the one or more biometric parameters measured at a time at which a snapshot was captured may be stored in associated with that snapshot. The stored value associated with a snapshot may also be used to determine a weight for the snapshot. For example, a snapshot associated with a high heart rate may be given a higher weight. In some cases, the weight given to a snapshot is inversely proportional to the similarity of the snapshot with temporally adjacent snapshots.

Once each snapshot is weighted, salient snapshots can be identified. The weight of each snapshot may be compared to a threshold weight. If the weight of a snapshot exceeds the threshold, it may be identified as a salient snapshot. In some embodiments, a secondary group of snapshots having weight below the threshold weight and above a minimum weight may be identified as associated with the salient snapshot. These secondary snapshots may be used to guide further navigation of the XR history by the user if the user selects a salient snapshot with which they are associated.

In some embodiments, for each cluster of snapshots, more than one salient snapshot may be selected up to a set maximum number of snapshots. This may be accomplished by adjusting the threshold weight to cause multiple snapshots to exceed the threshold. Alternatively, if multiple snapshots exceed the threshold, those with the highest weights, up to the set number of snapshots, may be selected. Once identified and selected for each cluster, the salient snapshots are generated for presentation to the user. The snapshots may be presented in temporal order, thus allowing the user to move through the snapshots in a manner that reflects the order of their experiences within the XR session(s).

Entities may also be ranked based on an interaction metric. For example, if the user did not interact with an entity (e.g., touch, look at for a period of time, speak to, etc.), that entity may be given a low rank. Entities with which the user interacted minimally, such as doors and lights, may be given slightly higher ranks. Entities with which the user had significant interaction may be given high ranks. When the user selects a salient snapshot, the entities within the associated cluster of snapshots may be generated for presentation in an order corresponding to the ranking of the entities. In some embodiments, the user may manually reorder the ranking of entities. In response to promotion of an entity, a second plurality of snapshots including the promoted entity may be identified and, from the second plurality of snapshots, a second plurality of salient snapshots may be identified.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
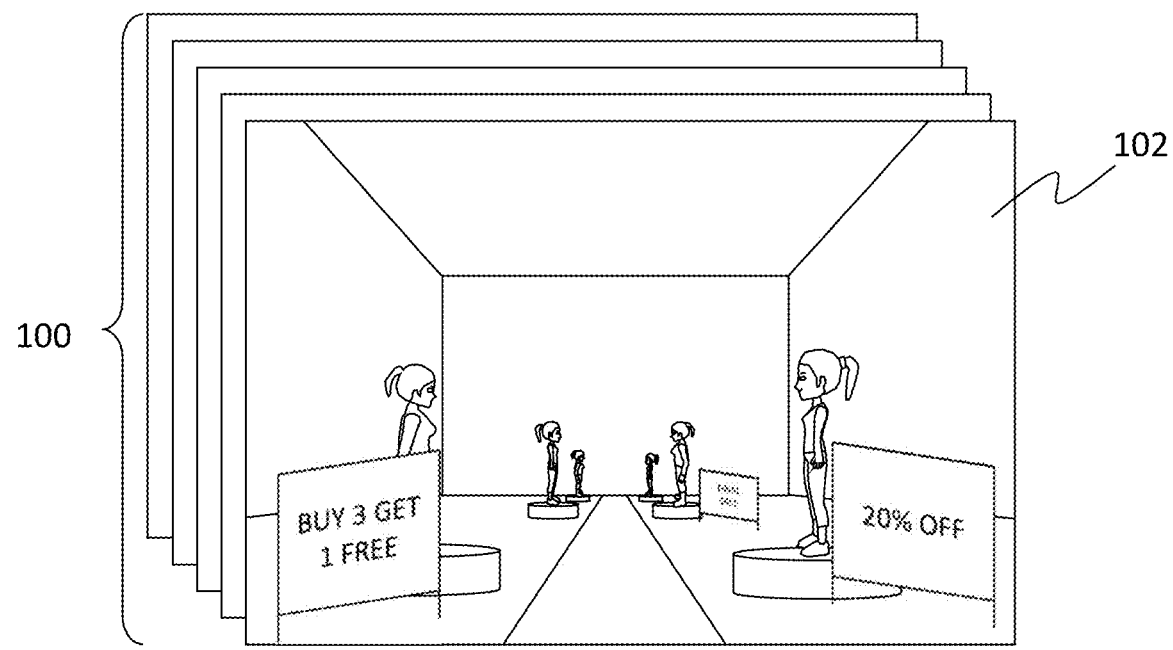
FIG. 1 shows an illustrative example of snapshots of an extended reality history, in accordance with some embodiments of the disclosure.
Figure 1:
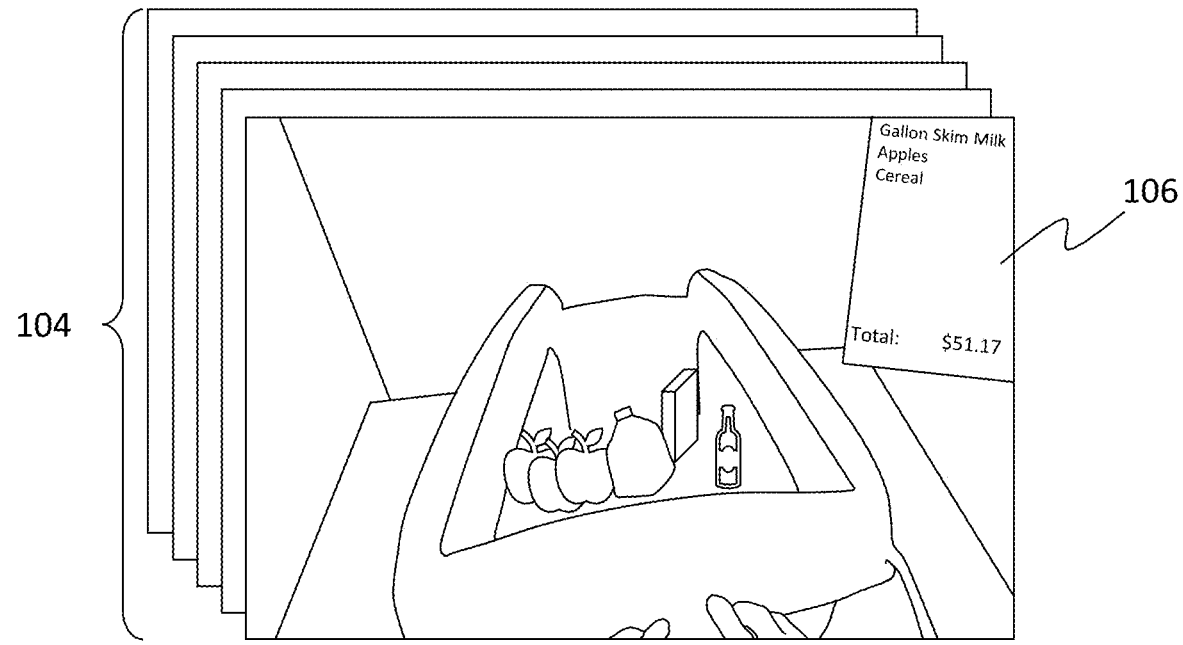

FIG. 1 shows an illustrative example of snapshots of an extended reality history, in accordance with some embodiments of the disclosure. During an XR session, a user may visit different locations. These may be virtual locations in a VR environment, or physical locations in an AR environment. For example, the user may use a VR headset to explore locations that are experienced entirely through generated imagery, sounds, and/or haptic feedback. During use of the VR headset, snapshots are captured of the user's experiences within the virtual locations. Snapshots may be captured periodically (e.g., every five seconds) and/or when significant events occur within the virtual location (e.g., a new entity appears in the location or the user interacts with an entity). The snapshots may be captured as images, similar to screenshots of a two-dimensional display, or as a copy of the data stream used by the VR headset to render the virtual location. When visiting physical locations, the user may wear an AR headset or use an AR-enabled device such as a smartphone. Snapshots from AR sessions may be captured using one or more cameras connected to, or integrated with, the AR device being used, in conjunction with metadata describing the AR content being displayed.

In the example of FIG. 1, the user visits a virtual clothing store and a virtual supermarket. Snapshots captured during the VR sessions are clustered together, with at least one salient snapshot. For example, cluster 100 includes snapshots from the virtual clothing store, with snapshot 102 being a salient snapshot from among cluster 100. Methods of determining salience of a snapshot will be discussed in further detail below. Cluster 104 includes snapshots from the virtual supermarket, with snapshot 106 being a salient snapshot from among cluster 104.

Figure 2:
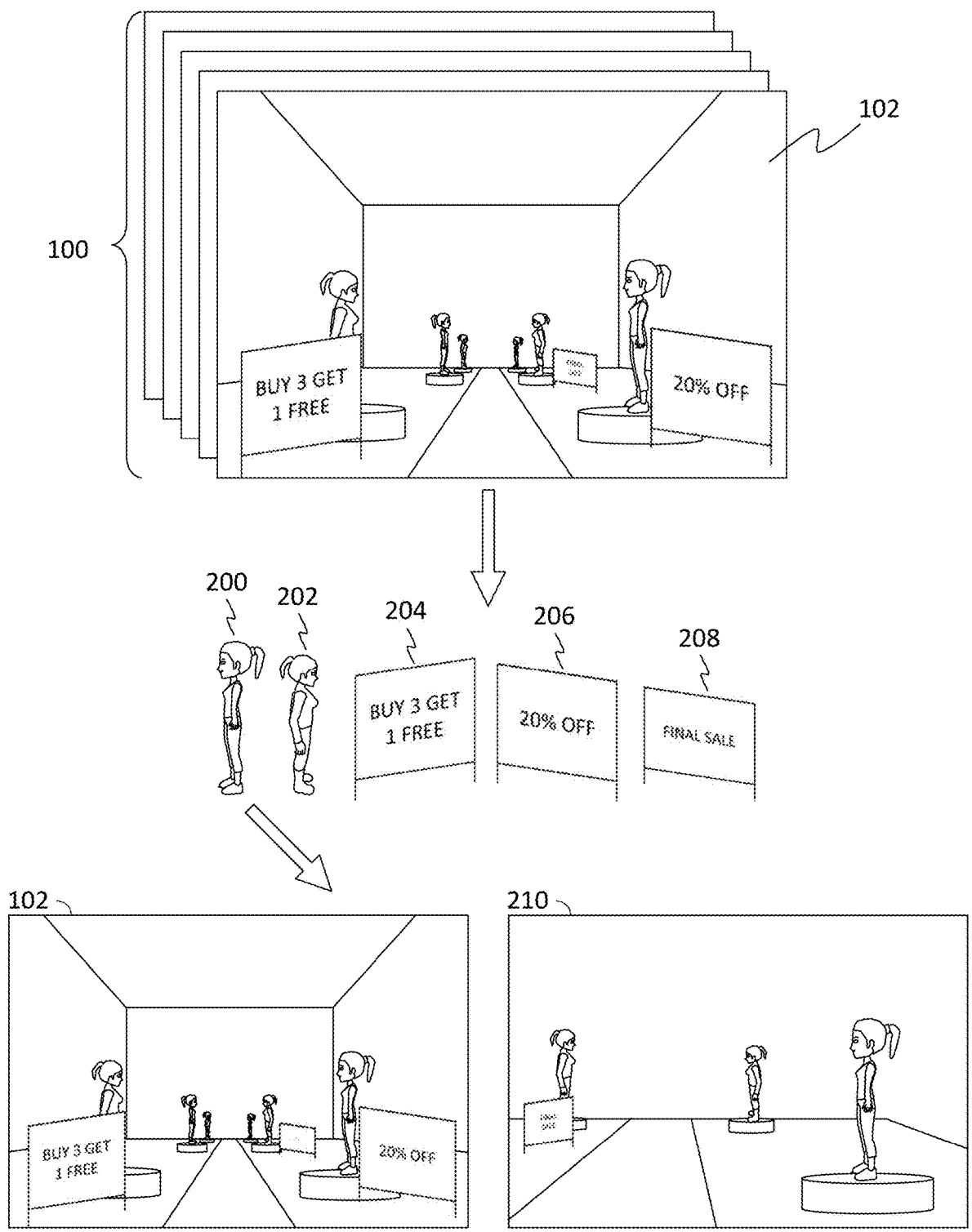
FIG. 2 shows an illustrative example of navigation through an extended reality history, in accordance with some embodiments of the disclosure.

Sometime after visiting the virtual locations, the user may wish to review a history of their experiences there. FIG. 2 shows an illustrative example of navigation through an extended reality history, in accordance with some embodiments of the disclosure. Salient snapshots from each cluster may be generated for presentation to the user. If the user is interested in reviewing the session history related to the virtual clothing store, the user may select snapshot 102 from cluster 100. In response to the selection, entities identified in any snapshot from within cluster 100 may be generated for presentation to the user. Mannequins 200 and 202, as well as signs 204, 206, and 208 may be generated for presentation. This allows the user to narrow their navigation of the session history by selecting an entity to review experiences involving that entity. For example, the user may wish to look at an outfit displayed on mannequin 200 in the virtual clothing store. In response to the selection, one or more snapshots including the selected entity are generated for display, such as snapshot 102 and snapshot 210, which both include mannequin 200.

Figure 3:
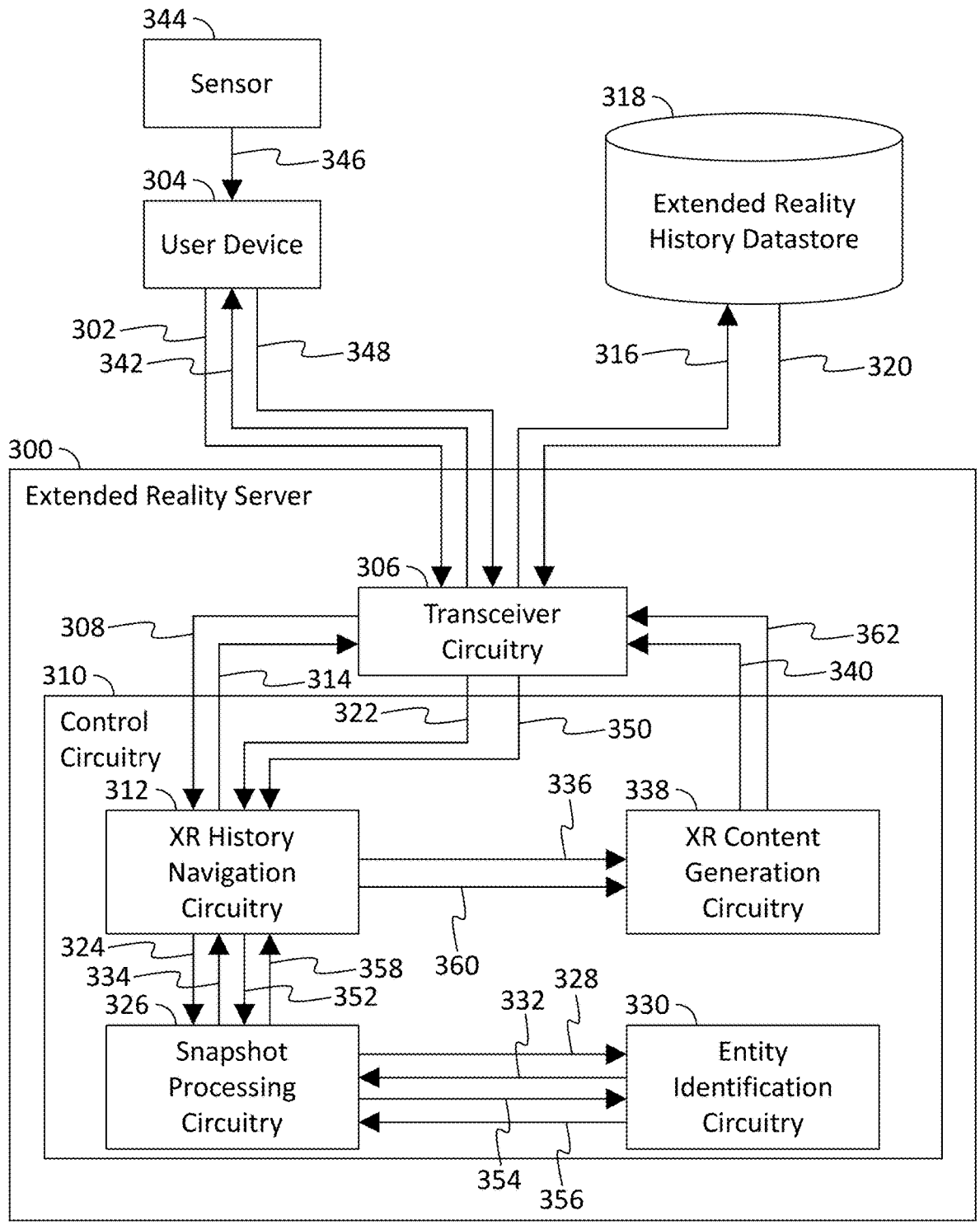
FIG. 3 is a block diagram showing components and dataflow therebetween of an extended reality server configured to present the extended reality history, in accordance with some embodiments of the disclosure.

FIG. 3 is a block diagram showing components and dataflow therebetween of an extended reality server configured to present the extended reality history, in accordance with some embodiments of the disclosure. Extended reality server 300 may be responsible for generating, processing, and transmitting XR content to user devices. XR server 300 receives 302 a request from user device 304 to navigate an XR history associated with user device 304 or a user account currently associated with user device 304. XR server 300 receives the request using transceiver circuitry 306. Transceiver circuitry 306 comprises a network connection over which data can be transmitted to and received from remote devices, such as an ethernet connection, Wi-Fi connection, mobile broadband interface, or connection employing any other suitable networking protocol.

Transceiver circuitry 306 transmits 308 the request to control circuitry 310, where it is received using XR history navigation circuitry 312. Control circuitry 310 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

XR history navigation circuitry 312 processes the request to identify the session for which the user has requested their history. For example, the request may indicate a date and/or time of the session or a session identifier. XR history navigation circuitry 312 may retrieve this information from the request and generate a query for snapshots from the requested session. XR history navigation circuitry 312 transmits 314 the query to transceiver circuitry 306, which in turn transmits 316 the request to XR history datastore 318. XR history datastore 318 may be a database or other data structure stored in memory local to XR server 300 or another device. In response to the request, XR history datastore 318 transmits 320 all stored snapshots from the requested session. Each snapshot may include visual, audio, and haptic information describing the environment in which the user was located when the snapshot was captured. Additionally, each snapshot may include biometric data of the user measured at the time the snapshot was captured.

Transceiver circuitry 306 receives the snapshots from XR history datastore 318 and transmits 322 the snapshots to XR history navigation circuitry 312. XR history navigation circuitry 312 determines which snapshots are salient and which are not. For example, XR history navigation circuitry 312 assigns a weight to each snapshot based on one or more snapshot parameters and identify snapshots having weights above a threshold as salient. To accomplish this, XR history navigation circuitry 312 transmits 324 each snapshot to snapshot processing circuitry 326. Snapshot processing circuitry 326 processes each snapshot to determine entities present in each snapshot, similarities between each snapshot, user engagement levels with entities in each snapshot at the time the snapshot was captured, and any other information useful in determining salience of a snapshot. To identify entities within a snapshot, snapshot processing circuitry 326 may search metadata of the snapshot for entity identifiers and attributes. In some embodiments, snapshot processing circuitry 326 transmits 328 each snapshot to entity identification circuitry 330, which may use image processing techniques in addition to snapshot metadata to identify the entities present in each snapshot. Entity identification circuitry 330 then transmits 332 a set of identified entities to snapshot processing circuitry 326.

Once each snapshot is processed, snapshot processing circuitry 326 transmits 334 all the data for the snapshot to XR navigation circuitry 312. XR navigation circuitry 312 assigns weights to each snapshot based on the data received from snapshot processing circuitry 326. XR navigation circuitry then selects the most highly weighted snapshots as salient and transmits 336 those snapshots to XR content generation circuitry 338. XR content generating circuitry 338 generates for presentation on user device 304 a visualization of the salient snapshots, which is then transmitted 340 to transceiver circuitry 306. Transceiver circuitry 306 in turn transmits 342 the visualizations to user device 304 for output to the user.

The user may select a salient snapshot. Input may be received at user device 304 or detected by sensor 344 and transmitted 346 to user device 304 selecting a snapshot. For example, the user's gaze may be tracked by a camera or other sensor. Alternatively or additionally, a controller or other input device may be used to select a snapshot. An identifier of the selected snapshot is transmitted 348 to XR server 300. The identifier is received using transceiver circuitry 306, which transmits 350 the identifier to XR history navigation circuitry 312.

In response to receiving the identifier of the selected snapshot, XR history navigation circuitry 312 retrieves the set of entities present in the cluster of snapshots to which the selected salient snapshot belongs. XR history navigation circuitry 312 may receive and retain the list of entities during snapshot processing or may transmit 352 the snapshot identifier to snapshot processing circuitry 326. Snapshot processing circuitry may retrieve the set of entities included in the cluster either from a local storage or by transmitting 354 the snapshot identifier to entity identification circuitry 330. Snapshot processing circuitry 326 then receives 356 the set of entities from entity identification circuitry 330.

Once retrieved, snapshot processing circuitry 326 transmits 358 the set of entities to XR history navigation circuitry 312. XR history navigation circuitry 312 may retrieve images of each entity from the cluster of snapshots. XR history navigation circuitry 312 then transmits 360 the set of entities and any corresponding images to XR content generation circuitry 338. As with the salient snapshot, XR content generation circuitry 338 generates visualizations of each entity and transmits 362 the visualizations to transceiver circuitry 306 for transmission to user device 304.

Further selections may be received from user device 304, such as selection of an entity from the set of entities. In response to such selection, XR history navigation circuitry 312 may retrieve all snapshots containing the selected entity and recompute weights for each based on any one or more of the parameters discussed above to identify new salient snapshots for the selected entity. The snapshots are generated for presentation to the user. The user may select a different entity or may select a snapshot to revisit. In response to the latter, XR content generation circuitry 338 may retrieve location information from the snapshot. This may be either physical location information (e.g., GPS coordinates) or virtual location information. Using the location information, XR content generation circuitry 338 retrieves and generates the location for presentation to the user. In some embodiments, XR content generation circuitry 338 first generates the snapshot for display as a full three-dimensional area, allowing the user to experience the snapshot itself. The user can then choose to revisit the location.

Figure 4:
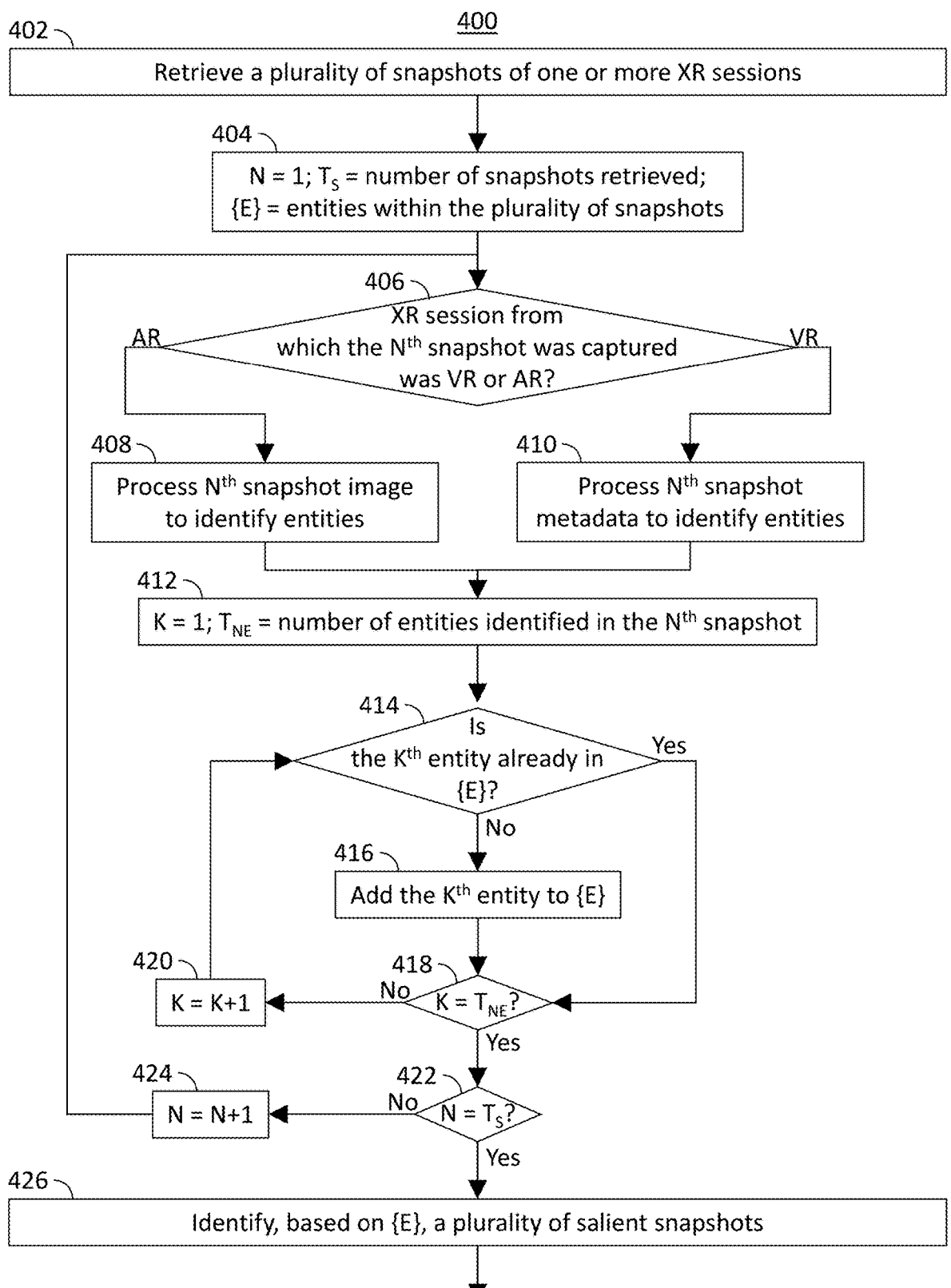
FIG. 4 is a flowchart representing an illustrative process for facilitating navigation of an extended reality history, in accordance with some embodiments of the disclosure.
Figure 4:
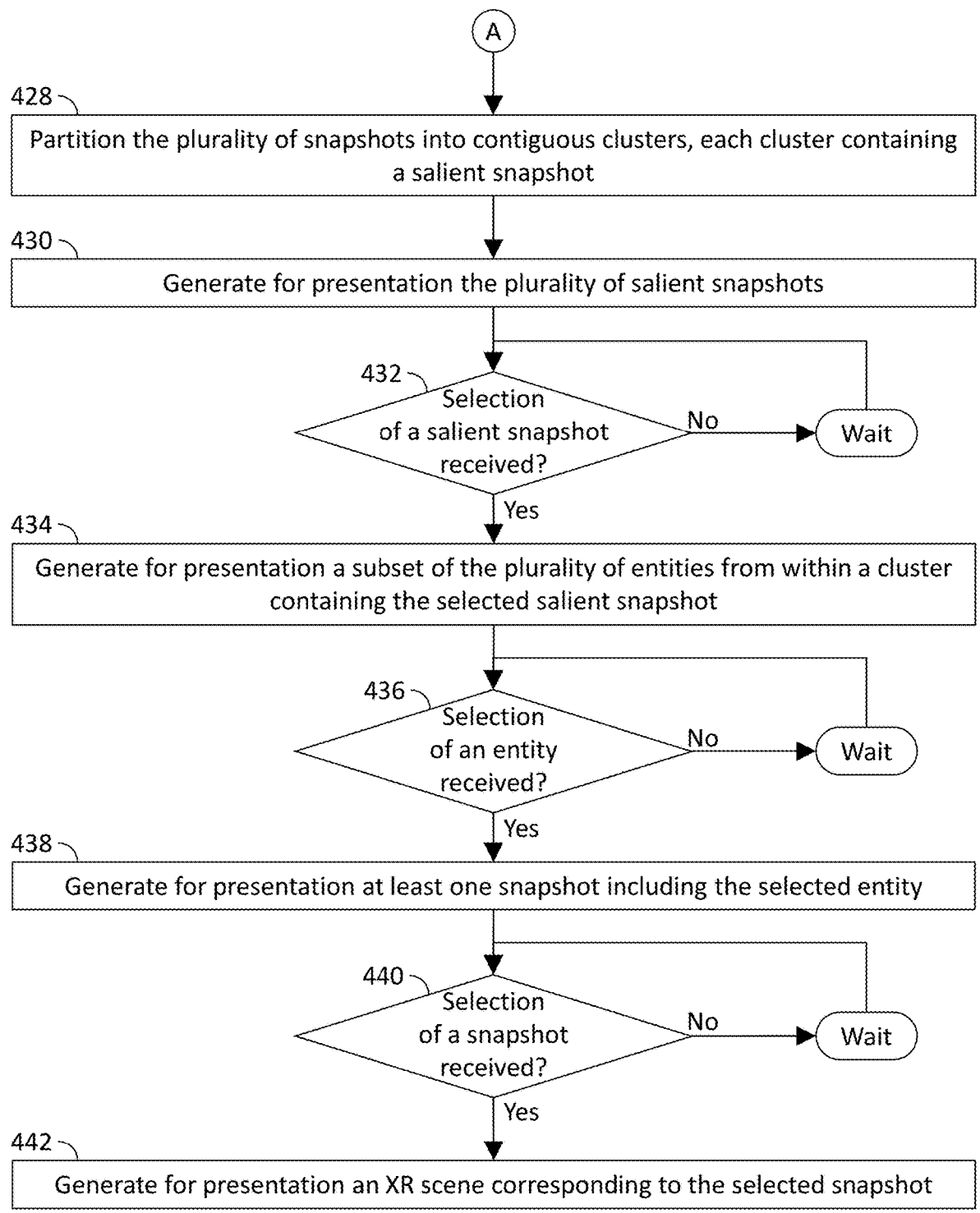

FIG. 4 is a flowchart representing an illustrative process 400 for facilitating navigation of an extended reality history, in accordance with some embodiments of the disclosure. Process 400 may be implemented on control circuitry 310. In addition, one or more actions of process 400 may be incorporated into or combined with one or more actions of any other process or embodiment described herein.

At 402, control circuitry 310 retrieves a plurality of snapshots of one or more XR sessions. During any XR sessions, whether AR or VR, a number of snapshots are captured, as discussed above. Each captured snapshot is stored in an XR history datastore and is associated with a user identifier corresponding to the user of the XR session during which the snapshot was captured. Control circuitry 310 may retrieve an identifier of the current user and query the XR history datastore for snapshots associated with the retrieved user identifier. The number of snapshots retrieved may be limited to a set number of snapshots or to any snapshots captured within a set time interval (e.g., the last seven days).

At 404, control circuitry 310 initializes a counter variable N, setting its value to one; a variable $T_S$ representing the number of snapshots retrieved; and an array or data structure {E} in which entities within the plurality of snapshots may be stored. At 406, control circuitry 310 determines whether the XR session from which the $N^{th}$ snapshot was captured was as AR session or a VR session. For example, each snapshot may include metadata indicating the type of session. Alternatively, snapshots may be captured in different formats depending on the type of XR session. For example, AR snapshots may be in an image format (e.g., JPEG), as the real-world environment in which the AR session took place must be captured as part of the snapshot, while VR snapshots may comprise metadata only. In some embodiments, each snapshot may be associated with a session ID. Control circuitry 310 may then retrieve data associated with the session ID of a snapshot, which may include an indication of the type of XR session.

If the session was an AR session ("AR" at 406), then, at 408, control circuitry 310 processes image data of the $N^{th}$ snapshot to identify entities contained in the $N^{th}$ snapshot. This may be accomplished using any known image processing or object recognition techniques. If the session was a VR session ("VR" at 406), then, at 410, control circuitry 310 processes metadata of the $N^{th}$ snapshot to identify entities contained within the $N^{th}$ snapshot. For example, metadata of the $N^{th}$ snapshot may include identifiers of virtual objects, avatars, or other entities rendered for display to the user during the time the snapshot was captured. In some cases, control circuitry 310 may access an entity library for the location within the virtual environment at which the $N^{th}$ snapshot was captured and retrieve the identified entity.

After identifying the entities contained within the $N^{th}$ snapshot, at 412, control circuitry 310 initializes a second counter variable K, setting its value to one, and a variable $T_{NE}$ representing the number of entities identified in the $N^{th}$ snapshot. At 414, control circuitry 310 determines whether the $K^{th}$ entity in the $N^{th}$ snapshot is already in {E}. For example, each entity may have, or be assigned by control circuitry 310, a unique identifier. Control circuitry 310 may then compare the identifier of the $K^{th}$ entity to the identifier of each entity in {E}. If the K t entity is not already in {E} ("No" at 414), then, at 416, control circuitry 310 adds the $K^{th}$ entity (or the identifier thereof) to {E}.

After adding the $K^{th}$ entity to {E}, or if the $K^{th}$ entity is already in {E} ("Yes" at 414), at 418, control circuitry 310 determines whether K is equal to $T_{NE}$, meaning that all entities within the $N^{th}$ snapshot have been processed. If K is not equal to $T_{NE}$ ("No" at 418), then, at 420, control circuitry 310 increments the value of K by one, and processing returns to 414. If K is equal to $T_{NE}$ ("Yes" at 418), then, at 422, control circuitry 310 determines whether N is equal to $T_S$, meaning that all snapshots have been processed. If N is not equal to $T_S$ ("No" at 422), then, at 424, control circuitry 310 increments the value of N by one, and processing returns to 406.

If N is equal to $T_S$ ("Yes" at 422), then, at 426, control circuitry 310 identifies, based on {E}, a plurality of salient snapshots. Methods for accomplishing this are described below in connection with FIGS. 5-9.

After identifying salient snapshots, at 428, control circuitry 408 partitions the plurality of snapshots into contiguous clusters, each cluster containing a salient snapshot. Snapshots may be captured at regular intervals, such as every 5, 10, or 30 seconds. This may result in a large number of snapshots that are temporally contiguous with a given salient snapshot. Control circuitry 310 may group the snapshots in temporally contiguous clusters around each salient snapshot. For example, a first salient snapshot may have been captured at time $t_1$ and a second salient snapshot may have been captured at time $t_2$. Control circuitry 310 may calculate a temporal midpoint between $t_1$ and $t_2$ and group snapshots captured from $t_1$ until the midpoint with the first salient snapshot and snapshots captured after the midpoint until $t_2$ with the second salient snapshot.

At 430, control circuitry 310 generates for presentation the plurality of salient snapshots. For example, control circuitry 310 may render a two-dimensional representation of each salient snapshot for display to the user. At 432, control circuitry 310 determines whether a selection of a salient snapshot has been received. For example, a user input device (e.g., a game controller, a motion sensitive controller, a mouse, a keyboard, etc.) may be used by the user to select a salient snapshot. Alternatively, the user's gaze and/or gestures may be tracked to determine if the user is looking at and/or virtually interacting with a salient snapshot. Voice commands may also be used to select a salient snapshot. If no such selection has been received ("No" at 432), then, control circuitry 310 continues to wait for an input.

If a selection of a salient snapshot is received ("Yes" at 432), then, at 434, control circuitry 310 generates for presentation a subset of the plurality of entities from within a cluster containing the selected salient snapshot. For example, a total of 20 entities may be identified from within the entire plurality of snapshots while only seven of those entities are present within the snapshots in the cluster with which the selected salient snapshot is associated. Thus, only those seven entities are generated for presentation. At 436, control circuitry 310 determines whether a selection of an entity has been received. This may be accomplished using the same methods described above in connection with determining whether a salient snapshot has been selected. If no selection has been received ("No" at 436), control circuitry 310 continues to wait for a selection.

If a selection of an entity is received ("Yes" at 436), then, at 438, control circuitry 310 generates for presentation at least one snapshot including the selected entity. For example, the selected entity may be present within five snapshots out of the cluster of snapshots with which the selected salient snapshot is associated. Control circuitry 310 would then generate for presentation at least one of those five snapshots. At 440, control circuitry 310 determines whether a selection of a snapshot has been received. This may be accomplished using the methods described above. If no selection has been received ("No" at 440), control circuitry 310 continues to wait for an input.

If a selection of a snapshot has been received ("Yes" at 440), then, at 442, control circuitry 310 generates for presentation an XR scene corresponding to the selected snapshot. For example, control circuitry 310 may render a new XR scene based on the selected snapshot. This new XR scene may be a static scene that the user can explore or may be fully or partially dynamic by incorporating data and/or entities from temporally adjacent snapshots, or even from the entire cluster. As another example, control circuitry 310 may identify the location at which the snapshot was captured and retrieve scene information from a server associated with the location. Each entity in the selected snapshot is then placed in the XR scene at a position described by the selected snapshot.

The actions or descriptions of FIG. 4 may be used with any other embodiment of this disclosure. In addition, the actions and descriptions described in relation to FIG. 4 may be done in suitable alternative orders or in parallel to further the purposes of this disclosure.

Figure 5:
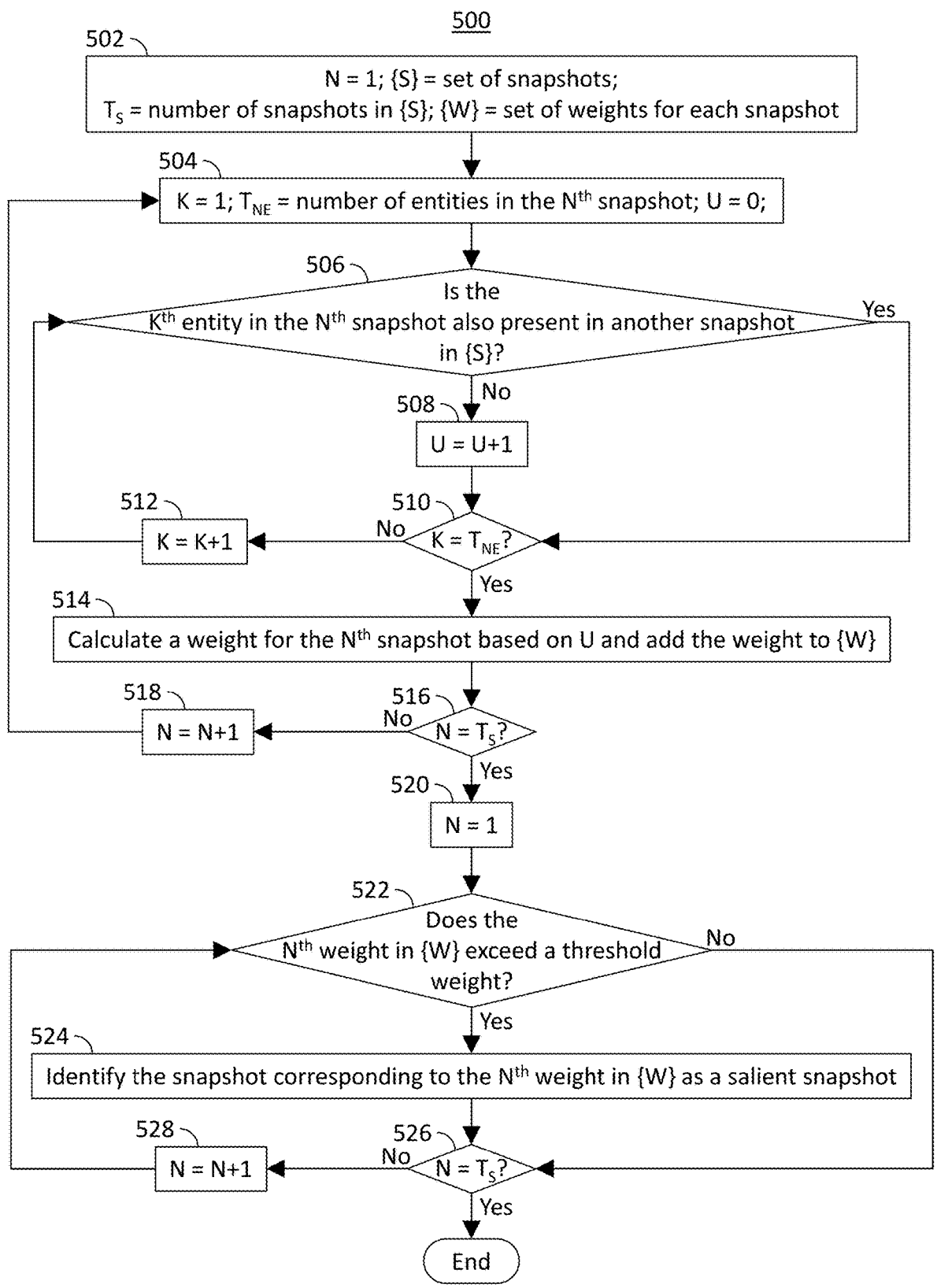
FIG. 5 is a flowchart representing an illustrative process for identifying salient snapshots based on the number unique entities contained in each snapshot, in accordance with some embodiments of the disclosure.

FIG. 5 is a flowchart representing an illustrative process 500 for identifying salient snapshots based on the number unique entities contained in each snapshot, in accordance with some embodiments of the disclosure. Process 500 may be implemented on control circuitry 310. In addition, one or more actions of process 500 may be incorporated into or combined with one or more actions of any other process or embodiment described herein.

At 502, control circuitry 310 initializes a counter variable N, setting its value to one; an array or data structure {S} representing the set of snapshots; a variable $T_S$ representing the number of snapshots in {S}; and an array or data structure {W} in which weights for each snapshots may be stored. At 504, control circuitry 310 initializes a second counter variable K, setting its value to one; a variable TNF, representing the number of entities in the $N^{th}$ snapshot; and a variable U, setting its value to zero.

At 506, control circuitry 308 determines whether the $K^{th}$ entity in the $N^{th}$ snapshot is also present in another snapshot in {S}. For example, control circuitry 310 may compare an identifier of the $K^{th}$ entity with a respective identifier of each entity in every other snapshot in {S}. In some embodiments, control circuitry 310 may first index all the entities so that the snapshots in which any entity is included can be quickly determined. For example, a search of the index for an identifier of the $K^{th}$ entity may return a list of snapshots that include the $K^{th}$ entity.

If the $K^{th}$ entity is not in any other snapshot in {S} ("No" at 506), then, at 508, control circuitry 310 increments the value of U by one. Then, or after determining that the $K^{th}$ entity is included in other snapshots in {S} ("Yes" at 506), at 510, control circuitry 310 determines whether K is equal to $T_{NE}$, meaning that all entities in the $N^{th}$ snapshot have been processed. If not ("No" at 510), then, at 512, control circuitry 310 increments the value of K, and processing returns to 506.

If K is equal to THE ("Yes" at 510), then, at 514, control circuitry 310 calculates a weight for the $N^{th}$ snapshot based on the value of U and adds the weight to {W}. The weight may be calculated in various ways. For example, control circuitry 310 may calculate the weight as a ratio of the number of unique entities (i.e., the value of U) to the total number of entities in the snapshot (i.e., $T_{NE}$). Alternatively, the weight may be calculated by multiplying the value of U by a scaling factor. In some embodiments, the value of U itself may be used as the weight. Once calculated, control circuitry 310 adds the weight as a new value in {W}.

At 516, control circuitry 310 determines whether N is equal to $T_S$, meaning that all snapshots in {S} have been processed. If N is not equal to $T_S$ ("No" at 516), then, at 518, control circuitry 310 increments the value of N by one, and processing returns to 504, where control circuitry 310 resets the values of K, $T_{NE}$, and U.

If N is equal to $T_S$ ("Yes" at 516), then, at 520, control circuitry 310 resets the value of N to one. Then, at 522, control circuitry 310 determines whether the $N^{th}$ weight in {W}, corresponding to the $N^{th}$ snapshot in {S}, exceeds a threshold weight. The threshold weight may be a static value or may be calculated based on the values in {W}. In some cases, a static threshold may be set at a value that exceeds all the values in {W} and thus none of the snapshots in {S} would be identified as salient. Control circuitry 310 may therefore calculate a value for the threshold based on the values in {W}. For example, control circuitry 310 may identify the highest value in {W} and set the threshold at 75% of that value. This ensures that at least one snapshot will be identified as salient. If the $N^{th}$ weight exceeds the threshold ("Yes" at 522), then, at 524, the corresponding snapshot is identified as a salient snapshot.

After identifying the $N^{th}$ snapshot as salient, or if the $N^{th}$ weight does not exceed the threshold ("No" at 522), at 526, control circuitry 310 determines whether N is equal to $T_S$. If not ("No" at 526), then, at 528, control circuitry 310 increments the value of N by one, and processing returns to 522. If N is equal to $T_S$ ("Yes" at 526), then the process ends.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
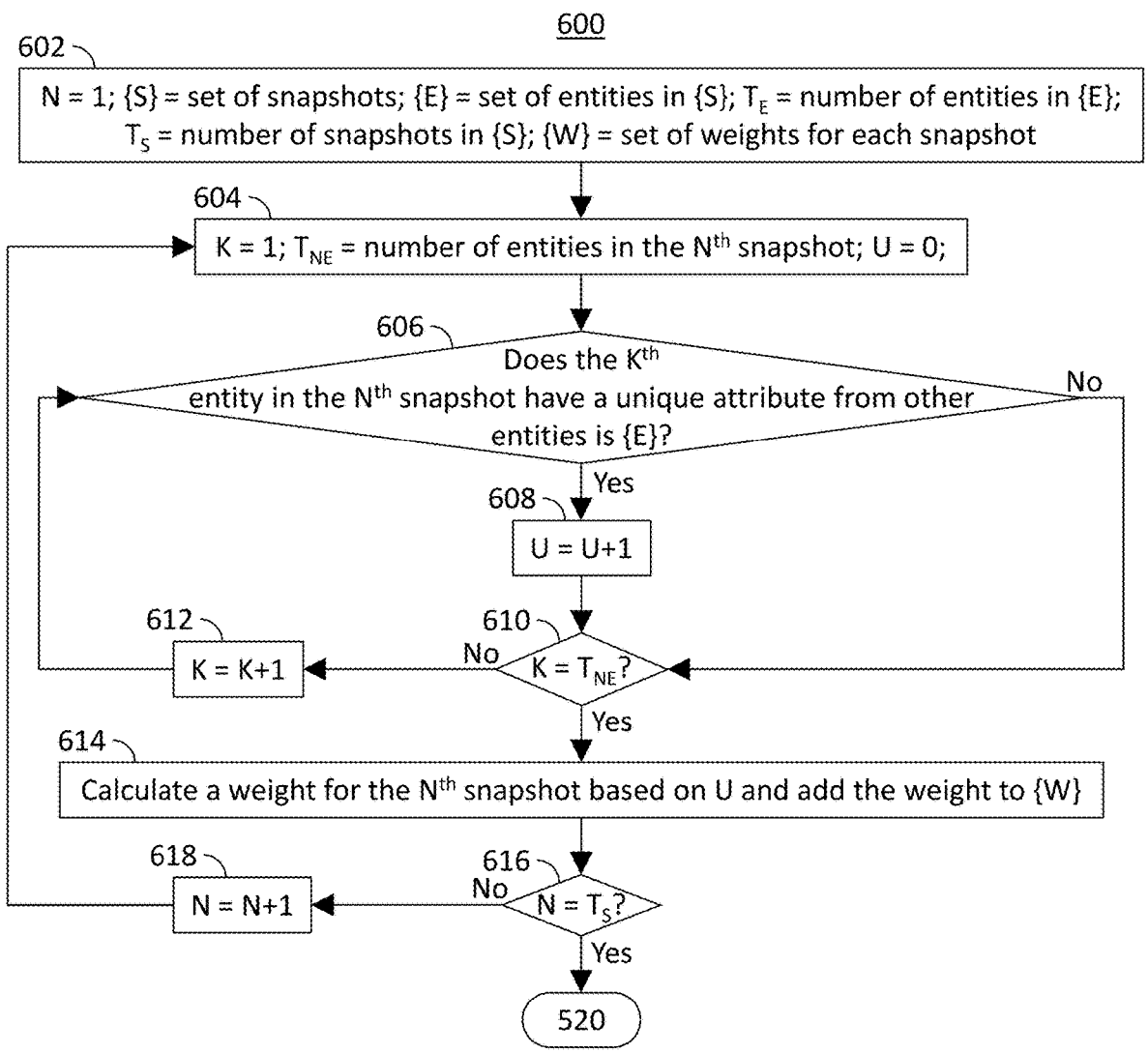
FIG. 6 is a flowchart representing an illustrative process for identifying salient snapshots based on the number of unique entity attributes contained in each snapshot, in accordance with some embodiments of the disclosure.

FIG. 6 is a flowchart representing an illustrative process 600 for identifying salient snapshots based on the number of unique entity attributes contained in each snapshot, in accordance with some embodiments of the disclosure. Process 600 may be implemented on control circuitry 310. In addition, one or more actions of process 600 may be incorporated into or combined with one or more actions of any other process or embodiment described herein.

At 602, control circuitry 310 initializes a counter variable N, setting its value to one; an array or data structure {S} representing the set of snapshots; an array or data structure {E} representing the set of entities in {S}; a variable $T_E$ representing the number of entities in {E}; a variable $T_S$ representing the number of snapshots in {S}; and an array or data structure {W} in which weights for each snapshot may be stored. At 604, control circuitry 310 initializes a second counter variable K, setting its value to one; a variable $T_{NE}$ representing the number of entities in the $N^{th}$ snapshot; and a variable U, setting its value to zero.

At 606, control circuitry 310 determines whether the $K^{th}$ entity in the $N^{th}$ snapshot has a unique attribute from other entities in {E}. Entity attributes, such as size, shape, color, texture, etc., may be retrieved from metadata describing each entity. Control circuitry 310 may compare one or more attributes of the $K^{th}$ entity with corresponding attributes of each other entity in {E} to determine if any other entity has the same or similar attributes. Control circuitry 310 may determine that another entity has the same or a similar attribute if the value of the attribute is within a threshold deviation from the attribute of the $K^{th}$ entity. For example, an entity having a size of 10 may be determined to be the same as an entity having a size of 9.5, but different from an entity having a size of 7. Similarly, an entity with an RGB color value of (255, 60, 60) may be determined to be the same as an entity having an RGB color value of (242, 0, 0), as both colors are essentially bright red.

If the $K^{th}$ entity has a unique attribute from all other entities in {E} ("Yes" at 606), then, at 608, control circuitry 310 increments the value of U by one. Then, or after determining that the $K^{th}$ entity does not have any unique attributes ("No" at 606), at 610, control circuitry 310 determines whether K is equal to $T_{NE}$, meaning that all entities in the $N^{th}$ snapshot have been processed. If not ("No" at 610), then, at 612, control circuitry 310 increments the value of K, and processing returns to 606.

If K is equal to THE ("Yes" at 610), then, at 614, control circuitry 310 calculates a weight for the $N^{th}$ snapshot based on the value of U and adds the weight to {W}. The weight may be calculated in different ways. For example, control circuitry 310 may calculate the weight as a ratio of the number of unique entity attributes (i.e., the value of U) to the total number of attributes for each entity, or as a ratio of the number of attributes in the $N^{th}$ snapshot having a threshold number of unique attributes to the number of entities in the $N^{th}$ snapshot. Once calculated, control circuitry 310 adds the weight as a new value in {W}.

At 616, control circuitry 310 determines whether N is equal to $T_S$, meaning that all snapshots in {S} have been processed. If N is not equal to $T_S$ ("No" at 616), then, at 618, control circuitry 310 increments the value of N by one, and processing returns to 604, where control circuitry 310 resets the values of K, $T_{NE}$, and U. If N is equal to $T_S$ ("Yes" at 616), then processing continues to 520, where salient snapshots are identified based on their weights.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
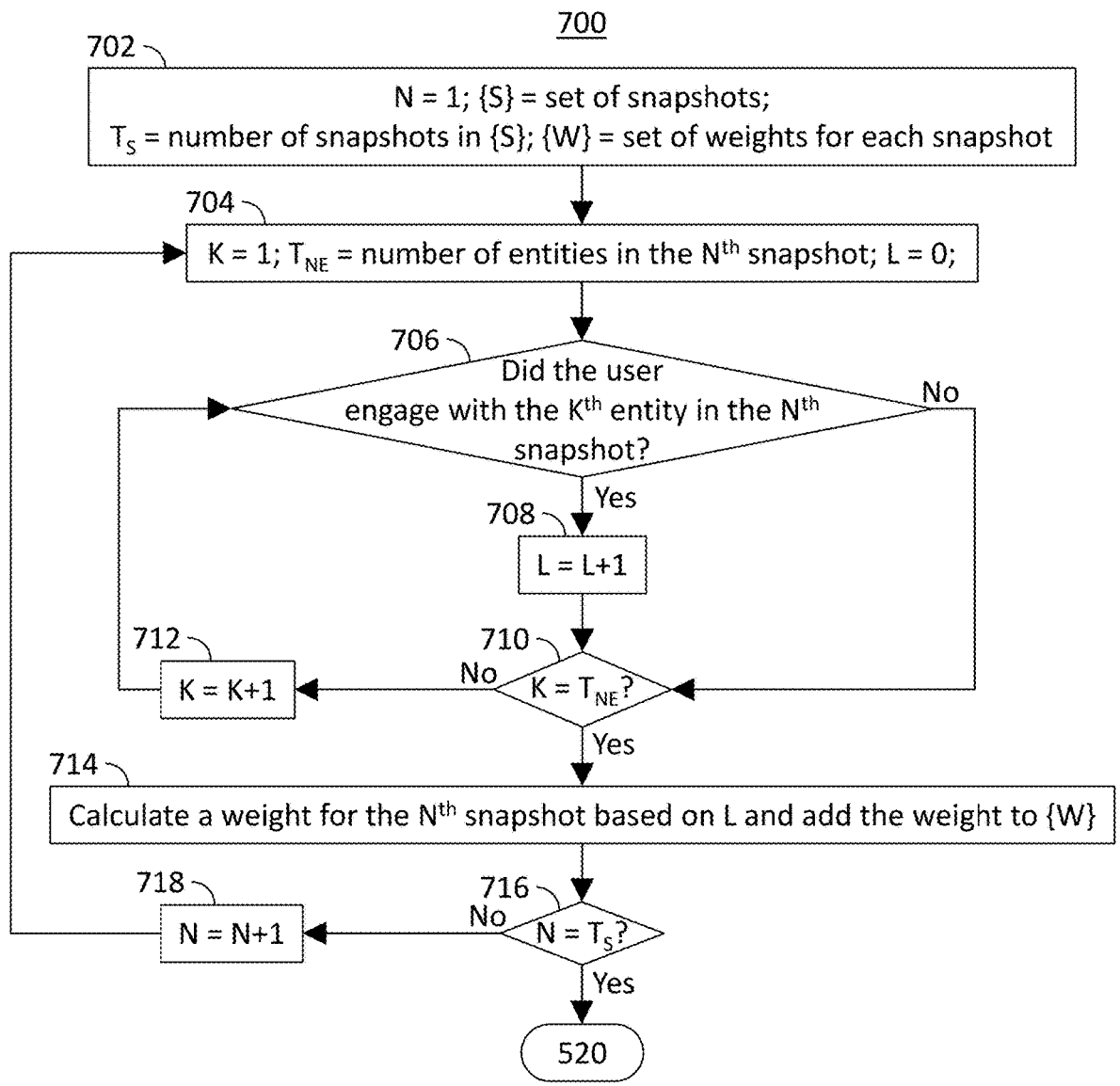
FIG. 7 is a flowchart representing an illustrative process for identifying salient snapshots based on user engagement with entities contained in each snapshot, in accordance with some embodiments of the disclosure.

FIG. 7 is a flowchart representing an illustrative process 700 for identifying salient snapshots based on user engagement with entities contained in each snapshot, in accordance with some embodiments of the disclosure. Process 700 may be implemented on control circuitry 310. In addition, one or more actions of process 700 may be incorporated into or combined with one or more actions of any other process or embodiment described herein.

At 702, control circuitry 310 initializes a counter variable N, setting its value to one; an array or data structure {S} representing the set of snapshots; a variable $T_S$ representing the number of snapshots in {S}; and an array or data structure {W} in which weights for each snapshot may be stored. At 704, control circuitry 310 initializes a second counter variable K, setting its value to one; a variable $T_{NE}$, representing the number of entities in the $N^{th}$ snapshot; and a variable L, setting its value to zero.

At 706, control circuitry 310 determines whether the user engaged with the $K^{th}$ entity in the $N^{th}$ snapshot. Metadata associated with the $N^{th}$ snapshot and/or the $K^{th}$ entity may include one or more interaction metrics describing interactions between the user (or the user's avatar) and each entity in the $N^{th}$ snapshot. For example, the user may have picked up or touched the entity, looked at the entity for a threshold amount of time, or talked to the entity. Other types of interactions may also be recorded.

If the user engaged with the $K^{th}$ entity ("Yes" at 706), then, at 708, control circuitry 310 increments the value of L by one. Then, or after determining that the user did not engage with the $K^{th}$ entity ("No" at 706), at 710, control circuitry 310 determines whether K is equal to $T_{NE}$, meaning that all entities in the $N^{th}$ snapshot have been processed. If not ("No" at 710), then, at 712, control circuitry 310 increments the value of K, and processing returns to 706.

If K is equal to THE ("Yes" at 710), then, at 714, control circuitry 310 calculates a weight for the $N^{th}$ snapshot based on the value of L and adds the weight as a new value in {W}. The weight may be calculated in different ways. For example, control circuitry 310 may calculate the weight as a ratio of the number of entities with which the user engaged (i.e., the value of L) to the total number of entities in the $N^{th}$ snapshot. Once calculated, control circuitry 310 adds the weight as a new value in {W}.

At 716, control circuitry 310 determines whether N is equal to $T_S$, meaning that all snapshots in {S} have been processed. If N is not equal to $T_S$ ("No" at 716), then, at 718, control circuitry 310 increments the value of N by one, and processing returns to 704, where control circuitry 310 resets the values of K, $T_{NE}$, and L. If N is equal to $T_S$ ("Yes" at 716), then processing continues to 520, where salient snapshots are identified based on their weights.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
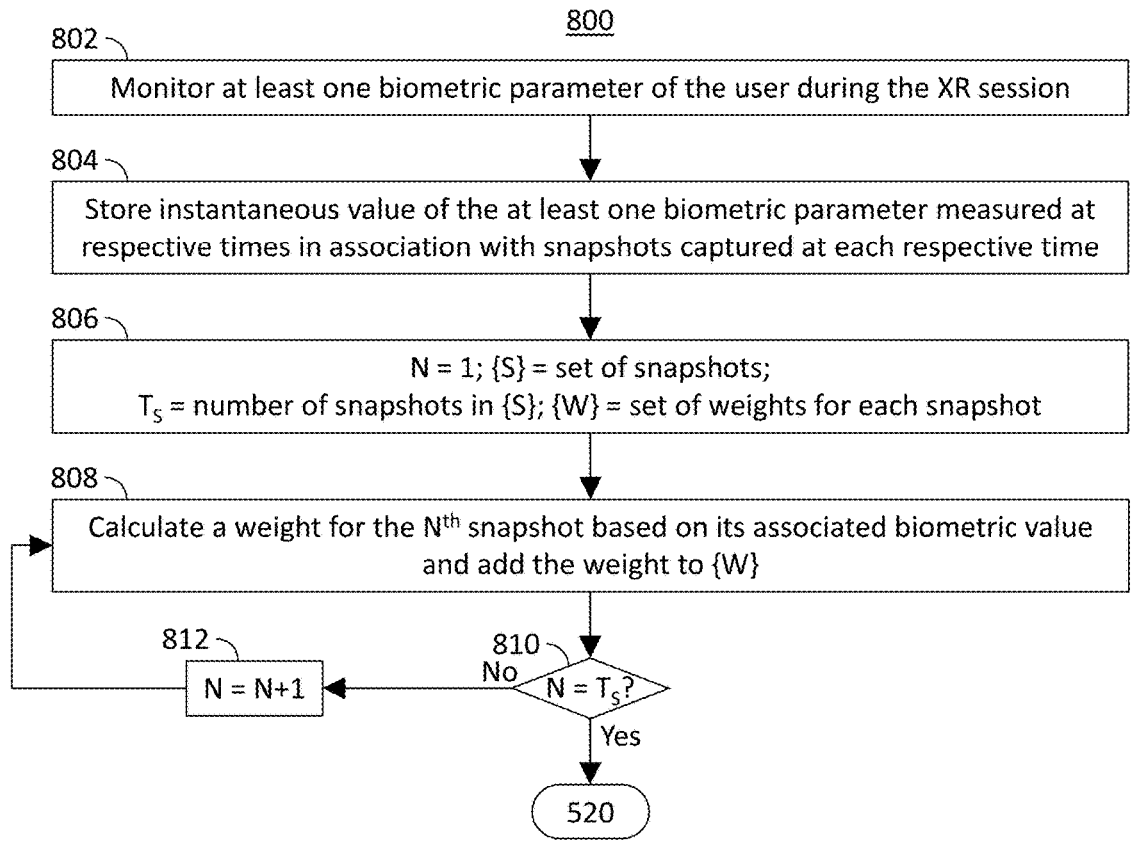
FIG. 8 is a flowchart representing an illustrative process for identifying salient snapshots based on biometric measurements associated with each snapshot, in accordance with some embodiments of the disclosure.

FIG. 8 is a flowchart representing an illustrative process 800 for identifying salient snapshots based on biometric measurements associated with each snapshot, in accordance with some embodiments of the disclosure. Process 800 may be implemented on control circuitry 310. In addition, one or more actions of process 800 may be incorporated into or combined with one or more actions of any other process or embodiment described herein.

At 802, control circuitry 310 monitors at least one biometric parameter of the user during the XR session. For example, control circuitry 310 may interface with, or receive data from, a heart rate sensor, galvanic skin sensor, brain wave sensor, or other sensor capable of measuring physiological parameters of a user. Alternatively or additionally, control circuitry 310 may monitor user movements, gestures, gaze direction, facial expressions, etc. At 804, control circuitry 310 stores an instantaneous value of the at least one biometric parameter measured at respective times in association with snapshots captured at each respective time. In other words, at the moment a snapshot is captured, the current biometric parameters of the user are also captured and stored in association with the captured snapshot. Thus, each snapshot has associated biometric information of the user.

At 806, control circuitry 310 initializes a counter variable N, setting its value to one; an array or data structure {S} representing the set of snapshots; a variable $T_S$ representing the number of snapshots in {S}; and an array or data structure {W} in which weights for each snapshot may be stored. At 808, control circuitry 310 calculates a weight for the $N^{th}$ snapshot based on its associated biometric value and adds the weight as a new value in {W}. The weight may be calculated based on a scale for each biometric value. For example, a heart rate scale may range from 60 bpm to 150 bpm. A value of 120 bpm is on the higher end of the scale and therefore results in a higher weight. Other scales appropriate for other parameters may also be used. In one embodiment, the user may be presented with sound data in user-friendly options. For example, the user could be provided with sounds that were part of the snapshots as textual representations such as "bang," "buzz," etc.

At 810, control circuitry 310 determines whether N is equal to $T_S$, meaning that all snapshots in {S} have been processed. If N is not equal to $T_S$ ("No" at 810), then, at 812, control circuitry 310 increments the value of N by one, and processing returns to 808. If N is equal to $T_S$ ("Yes" at 810), then processing continues to 520, where salient snapshots are identified based on their weights.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
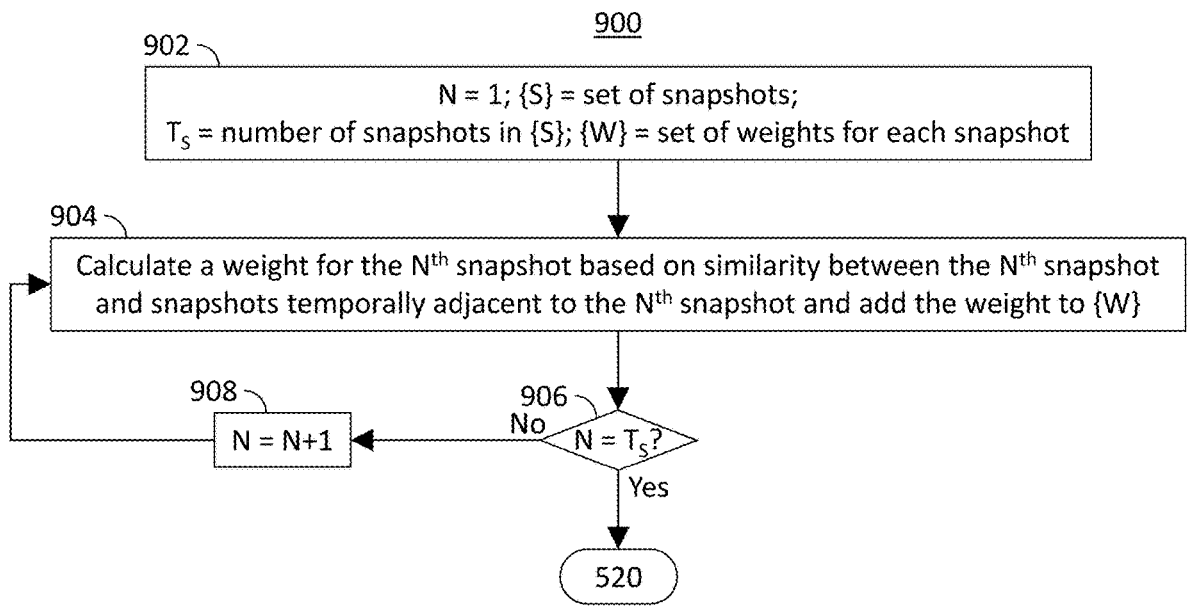
FIG. 9 is a flowchart representing an illustrative process for identifying salient snapshots based on similarity between temporally adjacent snapshots, in accordance with some embodiments of the disclosure.

FIG. 9 is a flowchart representing an illustrative process 900 for identifying salient snapshots based on similarity between temporally adjacent snapshots, in accordance with some embodiments of the disclosure. Process 900 may be implemented on control circuitry 310. In addition, one or more actions of process 900 may be incorporated into or combined with one or more actions of any other process or embodiment described herein.

At 902, control circuitry 310 initializes a counter variable N, setting its value to one; an array or data structure {S} representing the set of snapshots; a variable $T_S$ representing the number of snapshots in {S}; and an array or data structure {W} in which weights for each snapshot may be stored. At 904, control circuitry 310 calculates a weight for the $N^{th}$ snapshot based on similarity between the $N^{th}$ snapshot and snapshots temporally adjacent to the $N^{th}$ snapshot and adds the weight as a new value in {W}. Control circuitry 310 may evaluate entities and entity attributes in the $N^{th}$ snapshot and compare them with entities and entity attributes in the $N-1^{th}$ and $N+1^{th}$ snapshots. If, based on this comparison, the $N^{th}$ snapshot is similar to both adjacent snapshots, then the $N^{th}$ snapshot does not contain any unique features that would indicate salience. The degree of similarity may be determined, and the weight of the $N^{th}$ snapshot may be calculated as the inverse of the degree of similarity. For example, the degree of similarity may be expressed as a percentage of similar entities and entity attributes between two snapshots. A high percentage should result in a low weight. A snapshot with a 90% similarity with temporally adjacent snapshots should be given a weight corresponding to the 10% dissimilarity between the snapshots. The weight may therefore be calculated as the product of this dissimilarity value and a maximum weight value. If the $N^{th}$ snapshot is sufficiently dissimilar to one or both of the temporally adjacent snapshots, then the $N^{th}$ snapshot is unique and may have a higher weight value.

At 906, control circuitry 310 determines whether N is equal to $T_S$, meaning that all snapshots in {S} have been processed. If N is not equal to $T_S$ ("No" at 906), then, at 908, control circuitry 310 increments the value of N by one, and processing returns to 904. If N is equal to $T_S$ ("Yes" at 906), then processing continues to 520, where salient snapshots are identified based on their weights.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
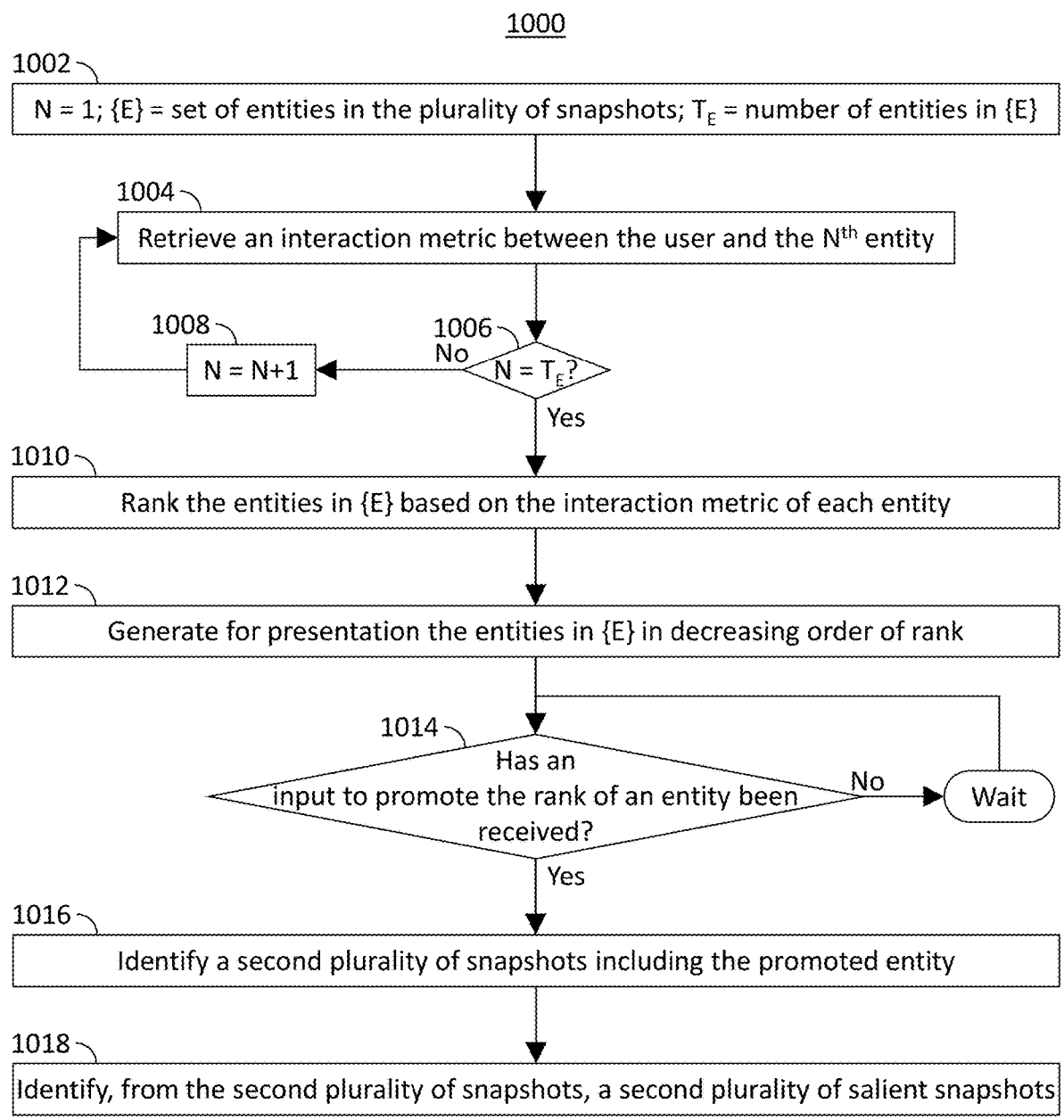
FIG. 10 is a flowchart representing an illustrative process for reevaluating salience of snapshots based on selection to promote an entity, in accordance with some embodiments of the disclosure.

FIG. 10 is a flowchart representing an illustrative process 1000 for reevaluating salience of snapshots based on selection to promote an entity, in accordance with some embodiments of the disclosure. Process 1000 may be implemented on control circuitry 310. In addition, one or more actions of process 1000 may be incorporated into or combined with one or more actions of any other process or embodiment described herein.

At 1002, control circuitry 310 initializes a counter variable N, setting its value to one; an array or data structure {E} representing the set of entities in the plurality of snapshots; and a variable $T_E$ representing the number of entities in {E}. At 1004, control circuitry 310 retrieves an interaction metric between the user and the $N^{th}$ entity. This metric may be similar to that described above in connection with FIG. 7. At 1006, control circuitry 310 determines whether N is equal to $T_E$, meaning that interaction metrics have been retrieved for all entities in {E}. If not ("No" at 1006), then, at 1008, control circuitry 310 increments the value of N by one, and processing returns to 1004.

If all the interaction metrics have been received ("Yes" at 1006), then, at 1010, control circuitry 310 ranks the entities in {E} based on the interaction metric of each entity. For example, control circuitry 310 may sort the entities in {E} by their respecting interaction metrics. In some embodiments, control circuitry 310 may use a number of cutoff thresholds to similarly rank entities having similar interaction metrics.

At 1012, control circuitry 310 generates for presentation the entities in {E} in decreasing order of rank. For example, control circuitry 310 may render a two-dimensional or three-dimensional representation of each entity, similar to the rendering of snapshots discussed above in connection with FIG. 4. The entities may be presented in a table or list, with higher-ranking entities being presented first. At 1014, control circuitry 310 determines whether an input to promote the rank of an entity has been received. For example, the user may manually reorder the list of entities to promote a lower-ranked entity to the top of the list. In some embodiments, a selection of an entity by the user may constitute a promotion of the selected entity to the highest rank. If no such selection has been received ("No" at 1014), control circuitry 310 may continue to wait for an input.

If an input promoting an entity has been received ("Yes" at 1014), then, at 1016, control circuitry 310 identifies a second plurality of snapshots including the promoted entity. Control circuitry 310 may retrieve an identifier of the promoted entity. Using the identifier, control circuitry 310 may then filter the set of snapshots to identify only those snapshots that include the promoted entity. At 1018, control circuitry 310 then identifies, from among the snapshots in this second plurality of snapshots, a second plurality of salient snapshots. This may be accomplished using any of the methods described above in connection with FIGS. 5-9.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for facilitating navigation of an extended reality history, the method comprising:
  capturing a plurality of snapshots of one or more extended reality sessions, wherein a period for capturing the plurality of snapshots is coarser than a frame rate of the one or more extended reality sessions;
  storing the plurality of snapshots in a datastore;
  retrieving, from the datastore, the plurality of snapshots of the one or more extended reality sessions;
  identifying a plurality of entities within the plurality of snapshots;
  determining a first snapshot of the plurality of snapshots containing a first entity of the plurality of entities that is present in only the first snapshot of the plurality of snapshots and thus is unique to the first snapshot in relation to the plurality of snapshots;
  determining that a degree of similarity between visual attributes of the first snapshot and visual attributes of snapshots temporally adjacent to the first snapshot is lower than a degree of similarity of another snapshot of the plurality of snapshots with respect to temporally adjacent snapshots of the other snapshot;
  based at least in part on determining that only the first snapshot contains the first entity that is unique to the first snapshot in relation to the plurality of snapshots and based at least in part on determining that the degree of similarity between the visual attributes of the first snapshot and the visual attributes of the snapshots temporally adjacent to the first snapshot is lower than the degree of similarity of the other snapshot of the plurality of snapshots with respect to the temporally adjacent snapshots of the other snapshot, assigning a higher weight to the first snapshot than to the other snapshot of the plurality of snapshots;
  identifying, based at least in part on the identified plurality of entities and comparing weights of the plurality of snapshots to a predetermined threshold weight, a plurality of salient snapshots, wherein the plurality of salient snapshots include the first snapshot containing the first entity that is unique to the first snapshot in relation to the plurality of snapshots and having been assigned the higher weight;
  partitioning the plurality of snapshots into contiguous clusters, each cluster containing a salient snapshot;
  generating for presentation the plurality of salient snapshots;
  based at least in part on selection of a presented salient snapshot, generating for presentation a subset of the plurality of entities from within a cluster containing the selected salient snapshot;
  based at least in part on selection of a presented entity of the presented subset of the plurality of entities, generating for presentation at least one snapshot including the selected entity; and based at least in part on selection of a snapshot of the presented at least one snapshot including the selected entity, generating for presentation an extended reality scene corresponding to the selected snapshot.

2. The method of claim 1, wherein identifying, based at least in part on the identified plurality of entities and comparing the weights of the plurality of snapshots to the predetermined threshold weight, the plurality of salient snapshots further comprises:
identifying a particular snapshot having a weight that exceeds the predetermined threshold weight.

3. The method of claim 1, wherein identifying, based at least in part on the identified plurality of entities and comparing the weights of the plurality of snapshots to the predetermined threshold weight, the plurality of salient snapshots further comprises:
assigning weights to snapshots of the plurality of snapshots based at least in part on a level of user engagement, during the one or more extended reality sessions, with entities within the respective snapshot; and
identifying a particular snapshot having a weight that exceeds the predetermined threshold weight.

4. The method of claim 1, further comprising selecting, for each cluster of snapshots, up to a set number of salient snapshots.

5. The method of claim 1, wherein generating for presentation the plurality of salient snapshots further comprises generating for presentation the plurality of salient snapshots in temporal order.

6. The method of claim 1, further comprising:
ranking each respective entity of the plurality of entities based on an interaction metric between a user and the respective entity;
wherein generating for presentation the subset of the plurality of entities further comprises generating for presentation the subset of the plurality of entities in decreasing order of rank.

7. The method of claim 6, further comprising:
based at least in part on receiving an input to promote the rank of an entity:
identifying a second plurality of snapshots including the promoted entity; and
identifying, from the second plurality of snapshots, a second plurality of salient snapshots.

8. A system for facilitating navigation of an extended reality history, the system comprising:
control circuitry comprising hardware, wherein the control circuitry is configured to:
capture a plurality of snapshots of one or more extended reality sessions, wherein a period for capturing the plurality of snapshots is coarser than a frame rate of the one or more extended reality sessions;
store the plurality of snapshots in a datastore;
retrieve, from the datastore, the plurality of snapshots of the one or more extended reality sessions;
identify a plurality of entities within the plurality of snapshots;
determine a first snapshot of the plurality of snapshots containing a first entity of the plurality of entities that is present in only the first snapshot of the plurality of snapshots and thus is unique to the first snapshot in relation to the plurality of snapshots;
determine that a degree of similarity between visual attributes of the first snapshot and visual attributes of snapshots temporally adjacent to the first snapshot is lower than a degree of similarity of another snapshot of the plurality of snapshots with respect to temporally adjacent snapshots of the other snapshot;
based at least in part on determining that only the first snapshot contains the first entity that is unique to the first snapshot in relation to the plurality of snapshots and based at least in part on determining that the degree of similarity between the visual attributes of the first snapshot and the visual attributes of the snapshots temporally adjacent to the first snapshot is lower than the degree of similarity of the other snapshot of the plurality of snapshots with respect to the temporally adjacent snapshots of the other snapshot, assign a higher weight to the first snapshot than to the other snapshot snapshots of the plurality of snapshots;
identify, based at least in part on the identified plurality of entities and comparing weights of the plurality of snapshots to a predetermined threshold weight, a plurality of salient snapshots, wherein the plurality of salient snapshots include the first snapshot containing the first entity that is unique to the first snapshot in relation to the plurality of snapshots and having been assigned the higher weight;
partition the plurality of snapshots into contiguous clusters, each cluster containing a salient snapshot;
generate for presentation the plurality of salient snapshots;
based at least in part on receiving selection of a presented salient snapshot, generate for presentation a subset of the plurality of entities from within a cluster containing the selected salient snapshot;
based at least in part on receiving selection of a presented entity of the presented subset of the plurality of entities, generate for presentation at least one snapshot including the selected entity; and
based at least in part on receiving selection of a snapshot of the presented at least one snapshot including the selected entity, generate for presentation an extended reality scene corresponding to the selected snapshot.

9. The system of claim 8, wherein the control circuitry configured to identify, based at least in part on the identified plurality of entities and comparing the weights of the plurality of snapshots to the predetermined threshold weight, the plurality of salient snapshots is further configured to:
identify a particular snapshot having a weight that exceeds the predetermined threshold weight.

10. The system of claim 8, wherein the control circuitry configured to identify, based at least in part on the identified plurality of entities and comparing the weights of the plurality of snapshots to the predetermined threshold weight, the plurality of salient snapshots is further configured to:
assign weights to snapshots of the plurality of snapshots based at least in part on a level of user engagement, during the one or more extended reality sessions, with entities within the respective snapshot; and
identify a particular snapshot having a weight that exceeds the predetermined threshold weight.

11. The system of claim 8, wherein the control circuitry is further configured to select, for each cluster of snapshots, up to a set number of salient snapshots.

12. The system of claim 8, wherein the control circuitry configured to generate for presentation the plurality of salient snapshots is further configured to generate for presentation the plurality of salient snapshots in temporal order.

13. The system of claim 8, wherein the control circuitry is further configured to:

rank each respective entity of the plurality of entities based on an interaction metric between a user and the respective entity;
wherein the control circuitry configured to generate for presentation the subset of the plurality of entities is further configured to generate for presentation the subset of the plurality of entities in decreasing order of rank.

14. The system of claim 13, wherein the control circuitry is further configured to:
based at least in part on receiving an input to promote the rank of an entity:
identify a second plurality of snapshots including the promoted entity; and
identify, from the second plurality of snapshots, a second plurality of salient snapshots.

15. The method of claim 1, further comprising:
monitoring at least one biometric parameter of a user during the one or more extended reality sessions; and
storing an instantaneous value of the at least one biometric parameter measured at a first time in association with a snapshot captured at the first time;
wherein identifying, the plurality of salient snapshots further comprises:
weighting snapshots of the plurality of snapshots based at least in part on the instantaneous value of the at least one biometric parameter associated with the respective snapshot; and
identifying at least one snapshot, for inclusion in the plurality of salient snapshots, having a weight that exceeds a threshold weight.

16. The method of claim 1, wherein identifying the plurality of salient snapshots further comprises:
identifying a particular snapshot of the plurality of snapshots having a weight that is below the predetermined threshold weight;
identifying the particular snapshot as being associated with a salient snapshot of the plurality of salient snapshots; and
based at least in part on selection of the salient snapshot, guiding the navigation of the extended reality history using the particular snapshot.

17. The system of claim 8, wherein the control circuitry is configured to determine the first snapshot contains the first entity that is present in only the first snapshot and thus is unique to the first snapshot in relation to the plurality of snapshots by:
identifying a type of the first entity;
identifying a first attribute of the first entity, wherein the first attribute relates to an appearance of the first entity in the first snapshot;
determining that the type of the first entity corresponds to a type of one or more entities contained in the plurality of snapshots; and
determining that, while the type of the first entity corresponds to the type of one or more entities contained in the plurality of snapshots, the identified first attribute of the first entity is not present in the one or more entities contained in the plurality of snapshots.

18. The method of claim 1, wherein the determining that the degree of similarity between the visual attributes of the first snapshot and the visual attributes of the snapshots temporally adjacent to the first snapshot comprises:
determining one or more entities and one or more entity attributes in the first snapshot;
determining one or more entities and one or more entity attributes in a second snapshot temporally prior to the first snapshot;
determining one or more entities and one or more entity attributes in a third snapshot temporally after the first snapshot; and
determining a percentage of similar entities and entity attributes between the first snapshot and the second and third snapshots.

19. The system of claim 8, wherein the control circuitry configured to determine that the degree of similarity between the visual attributes of the first snapshot and the visual attributes of the snapshots temporally adjacent to the first snapshot is further configured to:
determine one or more entities and one or more entity attributes in the first snapshot;
determine one or more entities and one or more entity attributes in a second snapshot temporally prior to the first snapshot;
determine one or more entities and one or more entity attributes in a third snapshot temporally after the first snapshot; and
determine a percentage of similar entities and entity attributes between the first snapshot and the second and third snapshots.

20. The method of claim 1, wherein each respective snapshot of the plurality of snapshots is assigned a weight that is inversely proportional to a degree of similarity between the respective snapshot and respective temporally adjacent snapshots in relation to the respective snapshot.

* * * * *